United States Patent
Ricci et al.

(10) Patent No.: US 8,214,562 B2
(45) Date of Patent: *Jul. 3, 2012

(54) PROCESSING OF DATA TO PERFORM SYSTEM CHANGES IN AN INPUT/OUTPUT PROCESSING SYSTEM

(75) Inventors: Louis W. Ricci, Hyde Park, NY (US); Mark P. Bendyk, Hyde Park, NY (US); Scott M. Carlson, Tucson, AZ (US); Daniel F. Casper, Poughkeepsie, NY (US); John R. Flanagan, Poughkeepsie, NY (US); Roger G. Hathorn, Tucson, AZ (US); Catherine C. Huang, Poughkeepsie, NY (US); Matthew J. Kalos, Tucson, AZ (US); Gustav E. Sittmann, Webster Groves, MO (US); Harry M. Yudenfriend, Poughkeepsie, NY (US); Matthew R. Craig, Sahuarita, AZ (US); Bret W. Holley, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 351 days.

This patent is subject to a terminal disclaimer.

(21) Appl. No.: 12/031,042

(22) Filed: Feb. 14, 2008

(65) Prior Publication Data
US 2009/0210561 A1 Aug. 20, 2009

(51) Int. Cl.
*G06F 3/00* (2006.01)
*G06F 5/00* (2006.01)
*G06F 13/12* (2006.01)
*G06F 1/00* (2006.01)
*H04L 1/00* (2006.01)
*H04L 12/50* (2006.01)
*H04J 3/17* (2006.01)

(52) U.S. Cl. .......... 710/59; 710/5; 710/11; 710/16; 710/62; 370/236; 370/360; 370/433; 713/323

(58) Field of Classification Search .............. None
See application file for complete search history.

(56) References Cited

U.S. PATENT DOCUMENTS
3,943,283 A 3/1976 Caragliano et al.
(Continued)

FOREIGN PATENT DOCUMENTS
DE 3931514 3/1990
(Continued)

OTHER PUBLICATIONS

Dauby, et al. "Contention Resolution Between Two Processors"; IBM Technical Disclosure Bulletin; vol. 26; No. 10A; Mar. 1984; 3 pages.

(Continued)

*Primary Examiner* — Tammara Peyton
*Assistant Examiner* — Henry Yu
(74) *Attorney, Agent, or Firm* — Cantor Colburn LLP; John Campbell

(57) ABSTRACT

A computer program product, an apparatus, and a method for processing communications between a target and an initiator an input/output processing system are provided. The computer program product includes a tangible storage medium readable by a processing circuit and storing instructions for execution by the processing circuit for performing a method. The method includes: sending a message from the initiator to the target, the message requesting suspension of input/output operations between the initiator and the target for a period of time, the period of time being defined by the message; responsive to the message, suspending input/output operation messages for the period of time; performing a system change comprising at least one of: at least one update, a computer program installation, a recovery, and a change in operating parameters; and initiating new input/output operations after at least one of: expiration of the period of time and initiation of new input/output operations by the initiator.

29 Claims, 15 Drawing Sheets

U.S. PATENT DOCUMENTS

| | | |
|---|---|---|
| 4,004,277 A | 1/1977 | Gavril |
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,325,492 A | 6/1994 | Bonevento et al. |
| 5,386,512 A | 1/1995 | Crisman et al. |
| 5,388,219 A | 2/1995 | Chan et al. |
| 5,410,727 A | 4/1995 | Jaffe et al. |
| 5,434,980 A | 7/1995 | Casper et al. |
| 5,440,729 A | 8/1995 | Kimura et al. |
| 5,461,721 A | 10/1995 | Cormier et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,561,809 A | 10/1996 | Elko et al. |
| 5,584,039 A | 12/1996 | Johnson et al. |
| 5,600,793 A | 2/1997 | Nord |
| 5,613,163 A | 3/1997 | Marron et al. |
| 5,640,600 A | 6/1997 | Satoh et al. |
| 5,758,190 A | 5/1998 | Johnson et al. |
| 5,768,620 A | 6/1998 | Johnson et al. |
| 5,787,071 A | 7/1998 | Basso et al. |
| 5,831,985 A | 11/1998 | Sandorfi |
| 5,860,022 A | 1/1999 | Kondou et al. |
| 5,894,583 A | 4/1999 | Johnson et al. |
| 5,901,327 A | 5/1999 | Ofek |
| 5,918,028 A | 6/1999 | Silverthorn et al. |
| 625,399 A | 9/2000 | Beardsley et al. |
| 6,230,218 B1 | 5/2001 | Casper et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,353,612 B1 * | 3/2002 | Zhu et al. ............... 370/360 |
| 6,401,223 B1 | 6/2002 | DePenning |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 * | 11/2006 | Fujibayashi ............... 711/162 |
| 7,149,823 B2 | 12/2006 | Miller et al. |
| 7,155,569 B2 | 12/2006 | Johnson et al. |
| 7,164,425 B2 | 1/2007 | Kwak et al. |
| 7,202,801 B2 | 4/2007 | Chou |
| 7,277,387 B2 | 10/2007 | Sanders et al. |
| 7,292,597 B2 * | 11/2007 | Mills et al. ............... 370/433 |
| 7,315,911 B2 | 1/2008 | Davies et al. |
| 7,382,733 B2 | 6/2008 | Banerjee et al. |
| 7,395,284 B2 * | 7/2008 | Sato et al. ............... 1/1 |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 * | 7/2009 | Jayakrishnan et al. ....... 370/236 |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 * | 12/2010 | Ricci et al. ............... 710/5 |
| 7,941,570 B2 | 5/2011 | Flanagan et al. |
| 2001/0030943 A1 | 10/2001 | Gregg et al. |
| 2002/0062407 A1 | 5/2002 | Tateyama et al. |
| 2002/0099904 A1 * | 7/2002 | Kawaguchi ............... 713/323 |
| 2002/0152338 A1 | 10/2002 | Elliott et al. |
| 2002/0178404 A1 | 11/2002 | Austen et al. |
| 2003/0002492 A1 | 1/2003 | Gallagher et al. |
| 2003/0056000 A1 | 3/2003 | Mullendore et al. |
| 2003/0084213 A1 | 5/2003 | Brice, Jr. et al. |
| 2003/0158998 A1 | 8/2003 | Smith |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0223291 A1 * | 10/2005 | Zimmer et al. ............... 714/34 |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0059638 A1 | 3/2008 | Hathorn et al. |
| 2008/0147889 A1 | 6/2008 | Casper et al. |
| 2008/0147890 A1 | 6/2008 | Casper et al. |
| 2008/0183877 A1 | 7/2008 | Carlson et al. |

| | | | |
|---|---|---|---|
| 2008/0235553 | A1 | 9/2008 | Chintada et al. |
| 2008/0256264 | A1 | 10/2008 | Muto et al. |
| 2008/0273518 | A1 | 11/2008 | Pratt et al. |
| 2008/0307122 | A1 | 12/2008 | Butler et al. |
| 2009/0049241 | A1 | 2/2009 | Ohno et al. |
| 2009/0055585 | A1 | 2/2009 | Fernandes et al. |
| 2009/0144586 | A1 | 6/2009 | Casper et al. |
| 2009/0172203 | A1 | 7/2009 | Casper et al. |
| 2009/0210557 | A1 | 8/2009 | Gainey, Jr. et al. |
| 2009/0210559 | A1 | 8/2009 | Flanagan et al. |
| 2009/0210560 | A1 | 8/2009 | Yudenfriend et al. |
| 2009/0210562 | A1 | 8/2009 | Huang et al. |
| 2009/0210563 | A1 | 8/2009 | Flanagan et al. |
| 2009/0210564 | A1 | 8/2009 | Ricci et al. |
| 2009/0210570 | A1 | 8/2009 | Bendyk et al. |
| 2009/0210571 | A1 | 8/2009 | Casper et al. |
| 2009/0210572 | A1 | 8/2009 | Yudenfriend et al. |
| 2009/0210573 | A1 | 8/2009 | Yudenfriend et al. |
| 2009/0210576 | A1 | 8/2009 | Casper et al. |
| 2009/0210579 | A1 | 8/2009 | Bendyk et al. |
| 2009/0210580 | A1 | 8/2009 | Bendyk et al. |
| 2009/0210581 | A1 | 8/2009 | Flanagan et al. |
| 2009/0210582 | A1 | 8/2009 | Bendyk et al. |
| 2009/0210583 | A1 | 8/2009 | Bendyk et al. |
| 2009/0210584 | A1 | 8/2009 | Carlson et al. |
| 2009/0210585 | A1 | 8/2009 | Ricci et al. |
| 2009/0210768 | A1 | 8/2009 | Carlson et al. |
| 2009/0210769 | A1 | 8/2009 | Casper et al. |
| 2009/0210884 | A1 | 8/2009 | Ricci et al. |
| 2009/0307388 | A1 | 12/2009 | Tchapda |
| 2010/0014526 | A1 | 1/2010 | Chavan et al. |
| 2010/0030919 | A1 | 2/2010 | Flanagan et al. |
| 2010/0030920 | A1 | 2/2010 | Casper et al. |
| 2010/0064072 | A1 | 3/2010 | Tang et al. |

FOREIGN PATENT DOCUMENTS

| | | |
|---|---|---|
| GB | 1264096 | 2/1972 |
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

DeVeer, J.A.; "Control Frame Multiplexing on Serial I/O Channels"; IBM Technical Disclosure Bulletin; vol. 32; No. 10A; Mar. 1990; pp. 39-40.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Final Office Action dated Jan. 4, 2010.

Iren, et al.; "The Transport Layer: Tutorial and Survey"; ACM Computing Surveys; vol. 31, No. 4; Dec. 1999; pp. 360-405.

Written Opinion and International Search Report for PCT/EP2009/051445 dated Jun. 25, 2009.

Written Opinion and International Search Report for PCT/EP2009/051446 dated Jun. 25, 2009.

Written Opinion and International Search Report for PCT/EP2009/051462 dated Jul. 1, 2009.

Written Opinion and International Search Report for PCT/EP2009/051450 dated Jul. 7, 2009.

Written Opinion and International Search Report for PCT/EP2009/051459 dated Jun. 23, 2009.

Written Opinion and International Search Report for PCT/EP2009/051463 dated Jul. 22, 2009.

Nordstrom.; "Sequence Reception Method for a Fibre Channel Protocol Chip"; IBM Technical Disclosure Bulletin; vol. 38, No. 12; Dec. 1995; pp. 267-269.

U.S. Appl. No. 11/548,060 Non-Final Office Action dated Apr. 15, 2008.

U.S. Appl. No. 11/548,093 Non-Final Office Action dated Apr. 17, 2008.

"Protocol for Insochronous Traffic Over Fiber Channel Switching"; IBM Technical Disclosure Bulletin; vol. 37, No. 06B; Jun. 1994. pp. 377-380.

Golasky, Richard; "Link-Level Error Recovery With Tape Backup"; Dell Power Solutions; Aug. 2005; pp. 88-91.

Sachs, M.W.; "I/O Marker Changing"; IBM Technical Disclosure Bulletin; vol. 37, No. 02A; Feb. 1994; pp. 75-76.

Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.

Snively, et al.; "Fibre Channel, Framing and Signaling"; (FC-FS) Rev. 1.70; NCITS Working Draft Proposed American National Standard for Information Technology; Feb. 2002; pp. i-575.

Srikrishnan et al.; "Sharing FCP Adapters Through Virtualization"; IBM J. Res. & Dev., vol. 51, No. 1/2; Jan./Mar. 2007; pp. 103-118.

Stone, et al.; "When the CRC and TCP Checksum Disagree"; SIGCOMM '00, Stockholm, Sweden; Jul. 2000; 10 pages.

U.S. Appl. No. 12/183,315, filed Jul. 31, 2008.

U.S. Appl. No. 12/183,323, filed Jul. 31, 2008.

U.S. Appl. No. 12/183,305, filed Jul. 31, 2008.

"z/Architecture-Principles of Operation," IBM Publication No. SA22-7832-04, 5th Ed., Sep. 2005.

Brice, et al.; U.S. Appl. No. 11/464,613; "Flexibility Controlling the Transfer of Data Between Input/Output Devices and Memory"; filed Aug. 15, 2006; Specification having 23 pages and Drawings having 4 sheets.

"IBM® z/Architecture Principles of Operation", Publication No. SA22-7832-05, 6th Edition, Apr. 2007. 1,215 pages separated into 4 electronic attachments.

Peterson, David; "Information Techonology, Fibre Channel Protocol for SCSI, Fourth Version (FCP-3)", Draft Proposed American National Standard, Jun. 2004; pp. 1-142.

Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.

U.S. Appl. No. 12/181,662—Non-Final Office Action dated Jun. 18, 2009.

International Search Report and Written Opinion for PCT/EP2009/051447 dated Jul. 1, 2009.

International Search Report and Written Opinion for PCT/EP2009/051483 dated Jul. 27, 2009.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,954 Non-Final Office Action dated Jan. 21, 2010.

Written Opinion and International Search Report for PCT/EP2009/051461 dated Sep. 22, 2009.

U.S. Appl. No. 12/031,182 Non-Final Office Action dated Jan. 22, 2010.

U.S. Appl. No. 12/031,201 Non-Final Office Action dated Jan. 25, 2010.

International Search Report; International Application No. PCT/EP2009/059184; International Filing Date: Jul. 16, 2009; Date of mailing: Jan. 14, 2010; 9 pages.

U.S. Appl. No. 12/030,967 Restriction Requirement Mailed Dec. 29, 2009.
ANSI INCITS 433-2007, Information Technology Fibre Channel Link Services (FC-LS), Jul. 2007.
Fibre Channel Single Byte Command Code Sets-2 Mapping Protocol (FC-SB-3), T11/Project 1357-D/Rev 1.6, INCITS Mar. 2003.
U.S. Appl. No. 12/030,951 Non-Final Office Action dated May 20, 2010.
U.S. Appl. No. 12/031,038, Non-Final Office Action Mailed Apr. 15, 2010.
U.S. Appl. No. 12/030,975. Final Office Action Mailed May 13, 2010.
U.S. Appl. No. 12/030,967, Notice of Allowance mailed Apr. 23, 2010.
U.S. Appl. No. 12/030,985, Non Final Office Action Mailed May 5, 2010.
U.S. Appl. No. 12/031,021, Notice of Allowance Mailed Apr. 30, 2010.
U.S. Appl. No. 12/183,305, Non-Final Office Action Mailed May 11, 2010.
U.S. Appl. No. 12/183,315 Notice of Allowance dated Jun. 15, 2010.
U.S. Appl. No. 12/030,989 Final Office Action dated May 24, 2010.
SCSI Primary Commands—4 (SPC-4); Project T10/1731-D. Rev 11. INCITS Apr. 14, 2010.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Behrs, Jr, "Adaptive Prediction Minimizes Data Overrun and Underrun", IBM, Nov. 1994, pp. 1-3. http://priorartdatabase.com/IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,038, Notice of Allowance Mailed Oct. 6, 2010.
Final Office Action for U.S. Appl. No. 12/030,912 mailed Oct. 6, 2010.
U.S. Appl. No. 12/031,182 Final Office Action Mailed Jul. 22, 2010.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,920 Notice of Allowance Mailed Aug. 23, 2010.
U.S. Appl. No. 12/030,954, Notice of Allowance mailed Dec. 28, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
Ishikawa, Hikaru, et al. "Bi-Directional OFDM Transmission using Adaptive Modulation that spreads Data Symbols". Power Line Communications and its Applications, 2006, IEEE International Symposium on, Vol., No., pp. 202-207.
Moore et al., Reconfiguration of Storage Elements to Improve Performance, IBM, Dec. 1983, pp. 1-3. http://priorartdatabas.com/IPCOM/000047719.
Tachikawa, T., et al. "ARQ protocols for bi-directional data transmission," Information Networking, 1998 (ICOIN-12) Proceedings., Twelfth International Conference on., Vol., No., pp. 468-473, Jan. 21-23, 1998.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
U.S. Appl. No. 12/030,912 Non Final Office Action Mailed Aug. 18, 2011.
U.S. Appl. No. 12/031,182 Final Office Action dated Oct. 20, 2011.

U.S. Appl. No. 12/030,925, Notice of Allowance Mailed Feb. 14, 2008.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
URL, http://en.wikipedia.org/wiki/FICON, FICON, Wikipedia, USA, Wikimedia Foundation, Inc., Aug. 9, 2011.
U.S. Appl. No. 13/024,468, Non Final Office Action Mailed Jan. 26, 2012.
U.S. Appl. No. 13/075,993, Final Office Action Mailed Feb. 13, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 12/030,993 Notice of Allowance Mailed Dec. 22, 2011.
U.S. Appl. No. 13/150,583, Non-Final Office Action Mailed Feb. 3, 2012.
U.S. Appl. No. 13/173,733, Non-Final Office Action Mailed Feb. 7, 2012.
U.S. Appl. No. 13/173,772 Non Final Office Action Mailed Feb. 3, 2012.

* cited by examiner

PROCESSING OF DATA TO PERFORM SYSTEM CHANGES IN AN INPUT/OUTPUT PROCESSING SYSTEM

BACKGROUND OF THE INVENTION

1. Field of the Invention

The present disclosure relates generally to input/output processing, and in particular, to coordinating protocol compatibility and operations associated with input/output processing.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Currently, there is no link protocol that allows for the exchange of operating parameters between the channel and the control unit, and allows the control unit to request that new commands be ceased for a selected period of time. Typically, current link protocols require that either the channel cease sending new commands, or that the control unit respond to new commands with a busy message. However, relying on such busy messages may result in errors and possible loss of the logical path established between the control unit and the channel.

Accordingly, there is a need in the art for protocols to allow for the exchange of selected operating parameters and to allow the control unit to request suspension of commands for a selected time period.

BRIEF SUMMARY OF THE INVENTION

Embodiments of the invention include a computer program product for processing communications between a target and an initiator in an input/output processing system. The computer program product includes a tangible storage medium readable by a processing circuit and storing instructions for execution by the processing circuit for performing a method. The method includes: sending a message from the initiator to the target, the message requesting suspension of input/output operations between the initiator and the target for a period of time, the period of time being defined by the message; responsive to the message, suspending input/output operation messages for the period of time; performing a system change comprising at least one of: at least one update, a computer program installation, a recovery, and a change in operating parameters; and initiating new input/output operations after at least one of: expiration of the period of time and initiation of new input/output operations by the initiator.

Additional embodiments include an apparatus for processing communications in an input/output processing system. The apparatus includes an initiator, and a target in communication with the initiator. The apparatus performs: sending a message from the initiator to the target, the message requesting suspension of input/output operations between the initiator and the target for a period of time, the period of time being defined by the message; responsive to the message, suspending input/output operation messages for the period of time; performing a system change comprising at least one of: at least one update, a computer program installation, a recovery, and a change in operating parameters; and initiating new input/output operations after at least one of: expiration of the period of time and initiation of new input/output operations by the initiator.

Further embodiments include a method of processing communications between an initiator and a target in an input/output processing system. The method includes: sending a message from the initiator to the target, the message requesting suspension of input/output operations between the initiator and the target for a period of time, the period of time being defined by the message; responsive to the message, suspending input/output operation messages for the period of time; performing a system change comprising at least one of: at least one update, a computer program installation, a recovery, and a change in operating parameters; and initiating new input/output operations after one of: expiration of the period of time and initiation of new input/output operations by the initiator.

Other apparatuses, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
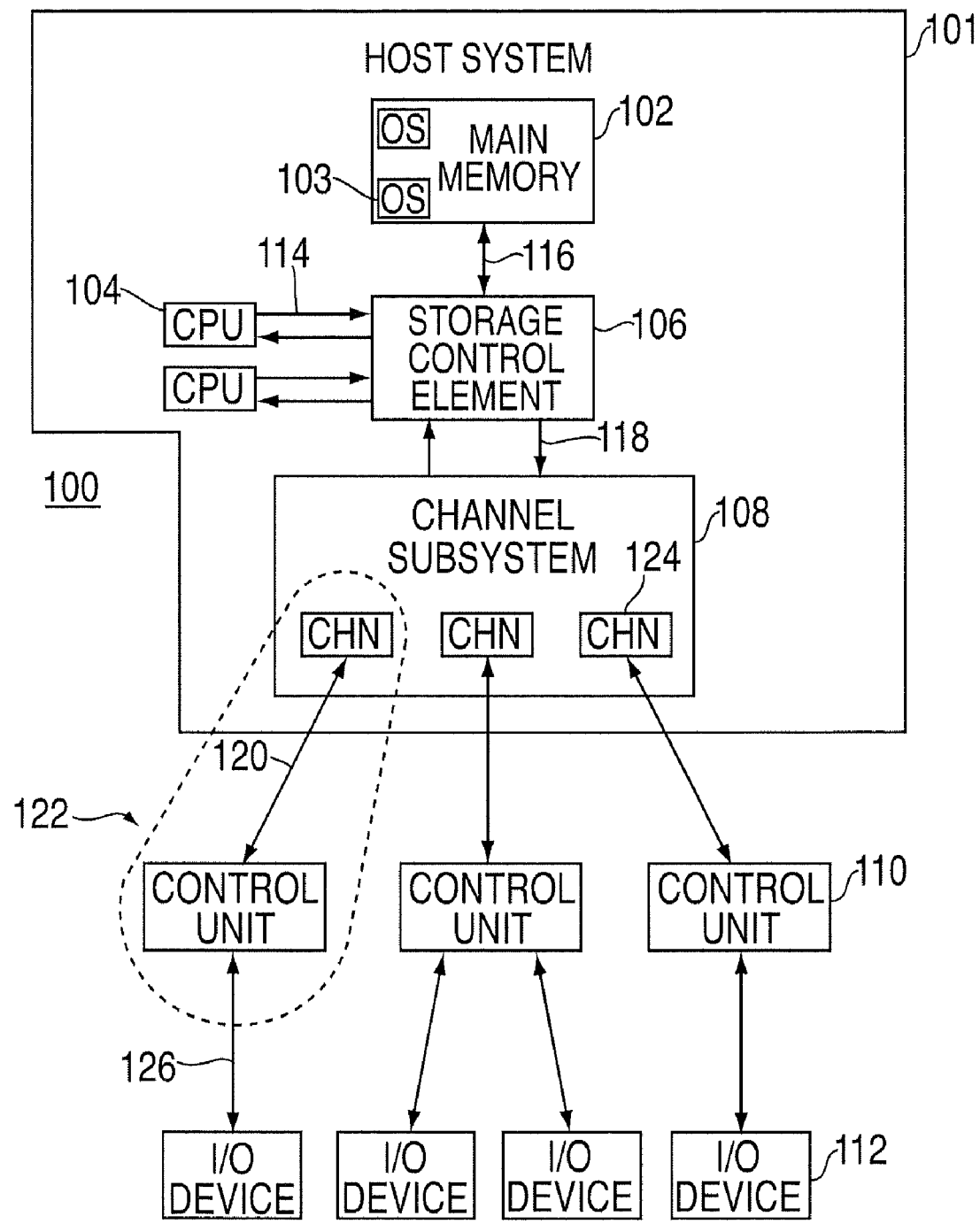
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling processing of information between an initiator device and a target device. As described herein, a "target" is a device, such as a SCSI device, that receives commands or requests and directs such commands or requests to one or more logical units for execution. Also as described herein, an "initiator" is a device, such as a SCSI device, that originates commands or requests to be processed by the target. The initiator and the target may operate under any suitable I/O protocol.

I/O processing is facilitated, in one example, by providing a system and method for determining whether the initiator and the target are compatible with the same protocol. Further, I/O processing is facilitated, in another example, by providing a system and method for communicating between an initiator and a target to suspend I/O operations. In yet another example, I/O processing is facilitated by providing a system and method for suspending I/O operations for performing system changes.

In one example, the initiator and the target operate under a Fiber Channel Protocol (FCP). FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety. In this example, the target may include an FCP Port using the FCP to perform various target functions. Also in this example, the initiator may include an FCP Port using the FCP to perform various initiator functions In another example, an I/O processing system includes a channel and a control unit. In some embodiments, the channel functions as an initiator by sending one or more commands to the control unit, which functions as the target. In other embodiments, the control unit functions as the initiator and the channel functions as the target. I/O processing is facilitated, in this example, by providing a system and method for determining whether the channel and the control unit are compatible with the same protocol. Further, I/O processing is facilitated, in another example, by providing a system and method for communicating between a control unit and a channel to suspend I/O operations.

In one exemplary embodiment, when the control unit is identified as compatible with the protocol used by the channel, the channel may include one or more commands in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message in response to executing the channel program. The control unit may also generate a response message without executing the channel program under a limited number of communication scenarios, e.g., to inform the I/O communications adapter that the channel program will not be executed. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting information, and performs further operations using the extracted information.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
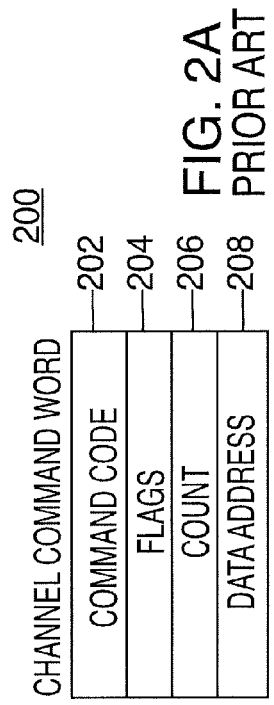
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 221 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs.

Figure 5:
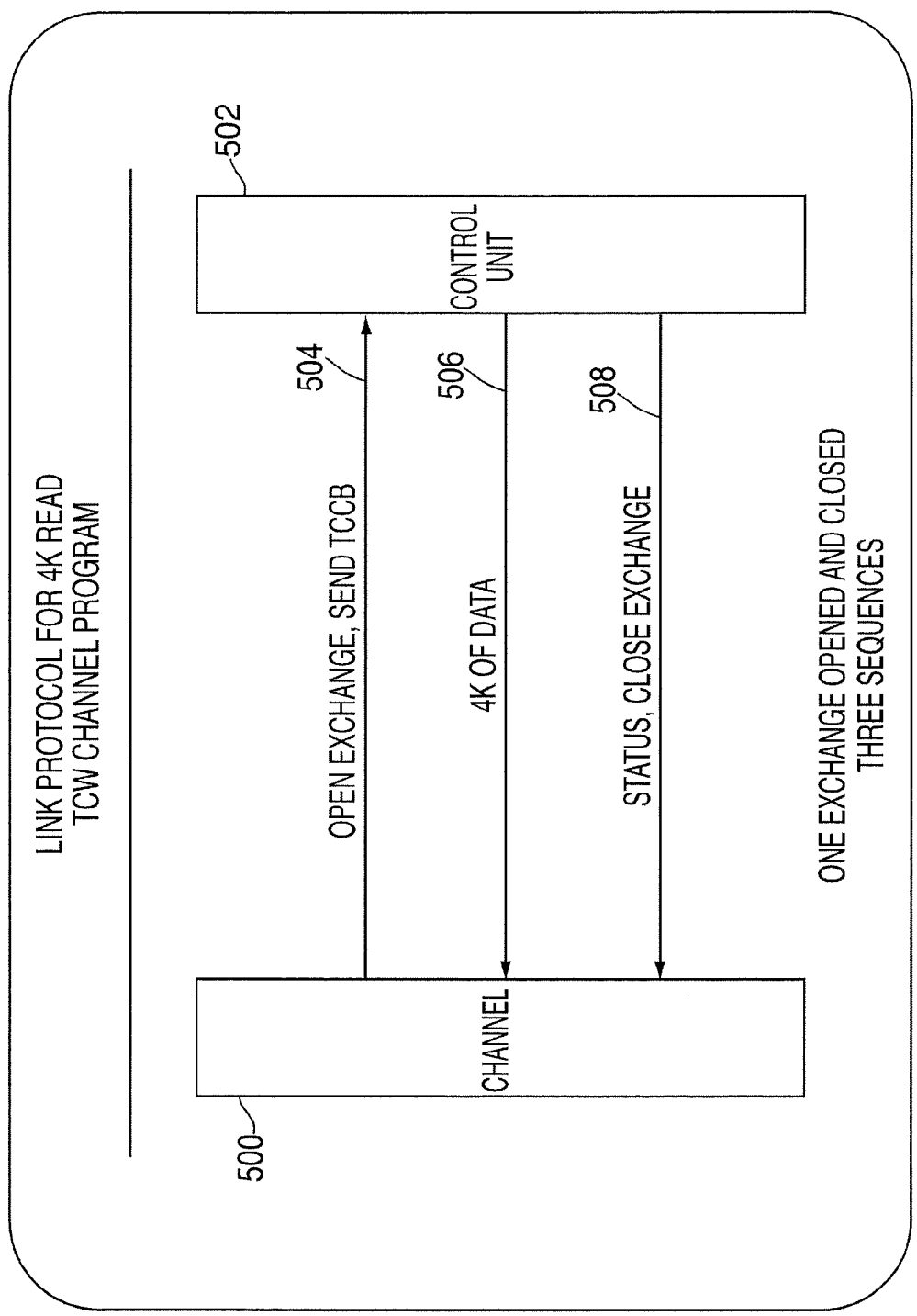
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP_IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
 1. Transfer a TCCB in the FCP_CMND IU.
 2. Transfer the IU of data, and sequence initiative to the control unit 502. (FCP Transfer Read
 3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
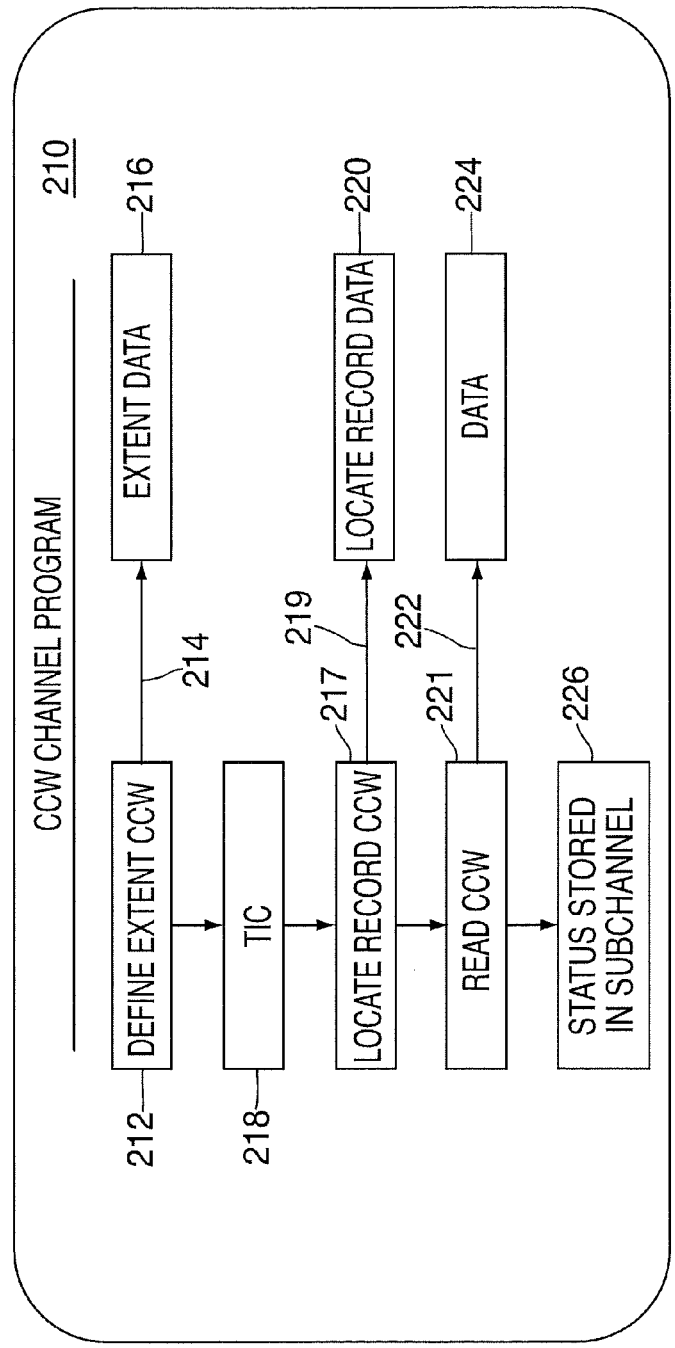
FIG. 2B depicts one example of a prior art channel command word channel program.
Figure 3:
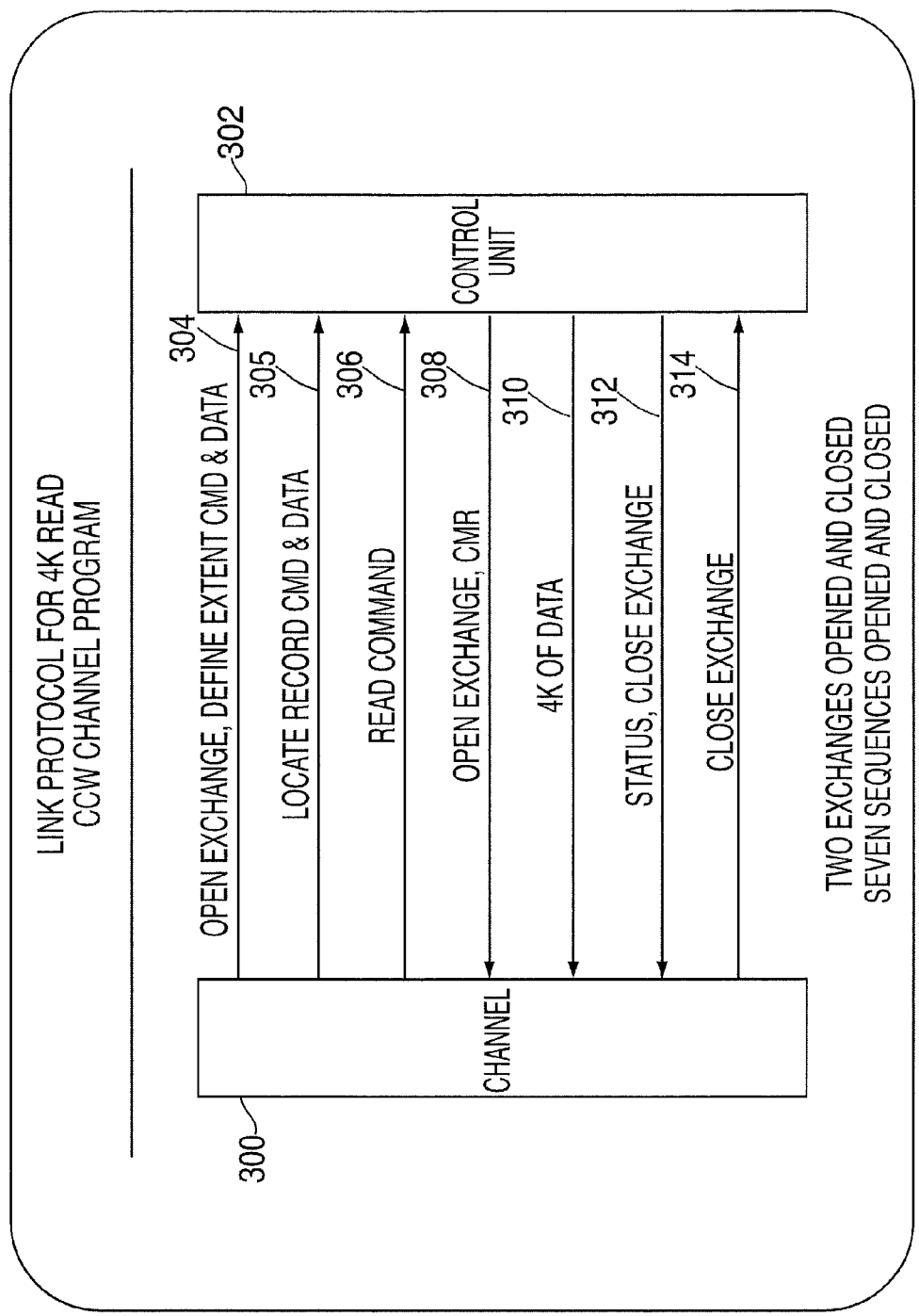
FIG. 3 depicts one embodiment of a prior art link protocol used in communicating between a channel and control unit to execute the channel command word channel program of FIG. 2B.
Figure 4:
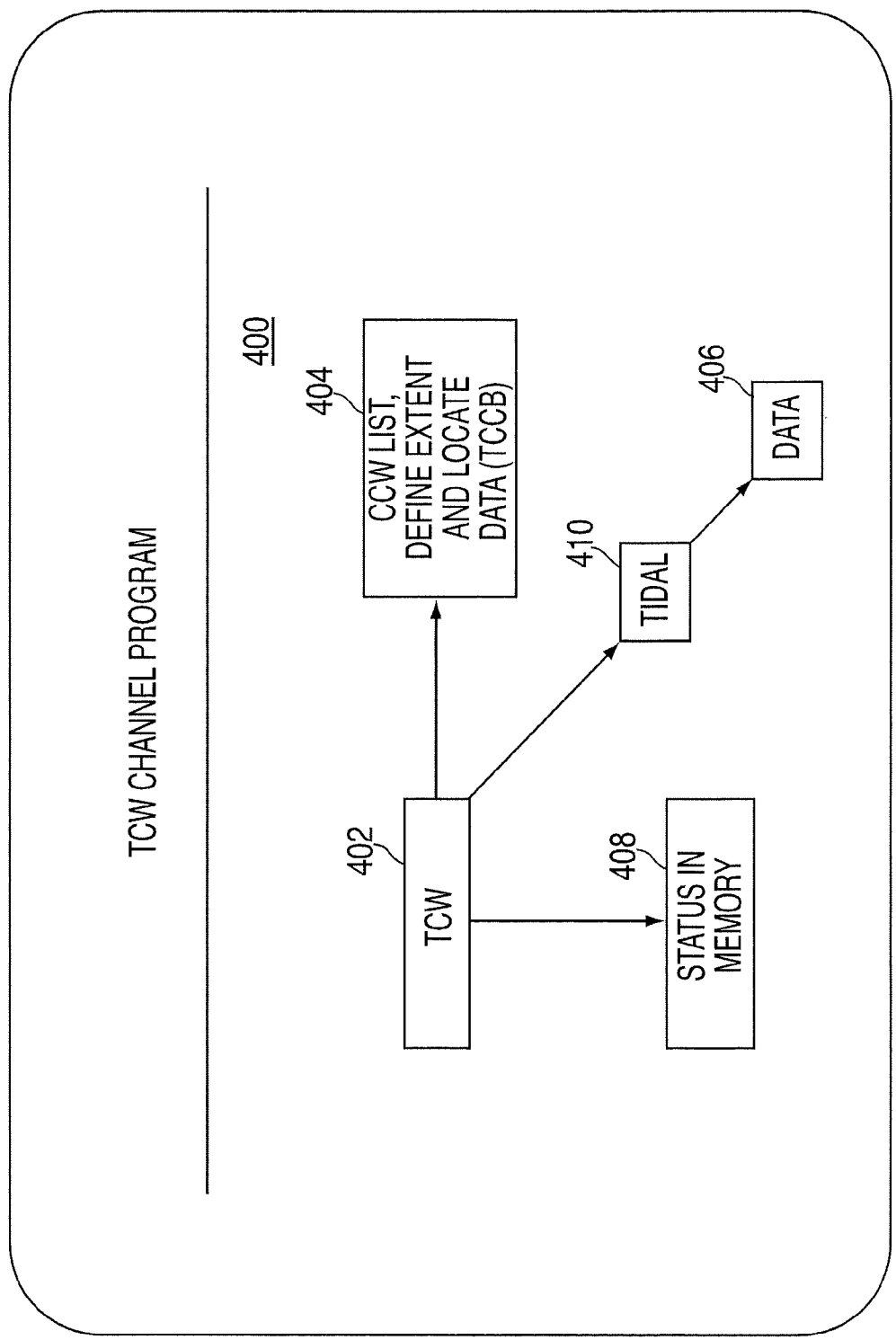
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 6:
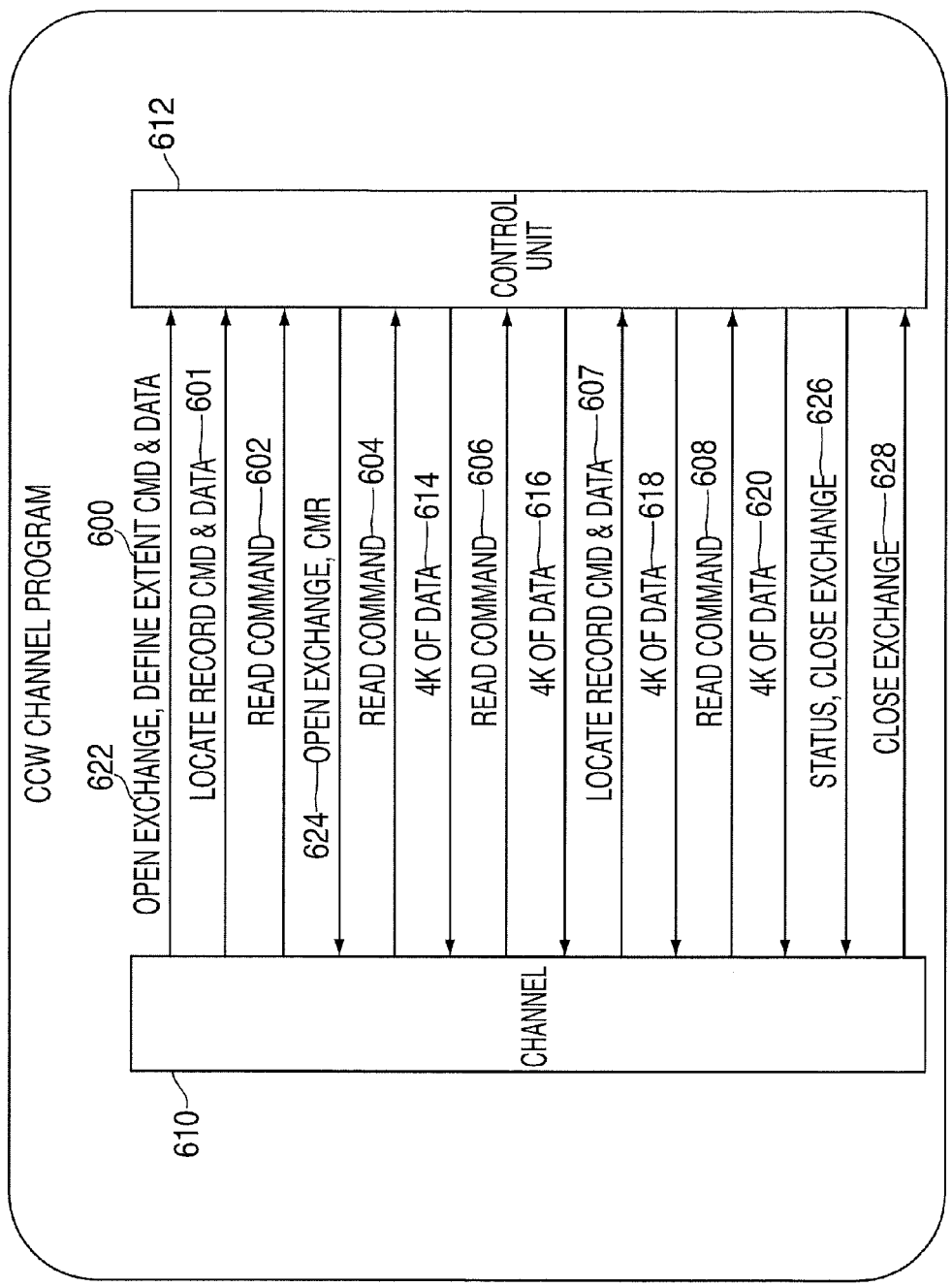
FIG. 6 depicts one embodiment of a prior art link protocol used to communicate between a channel and control unit in order to execute four read commands of a channel command word channel program.
Figure 7:
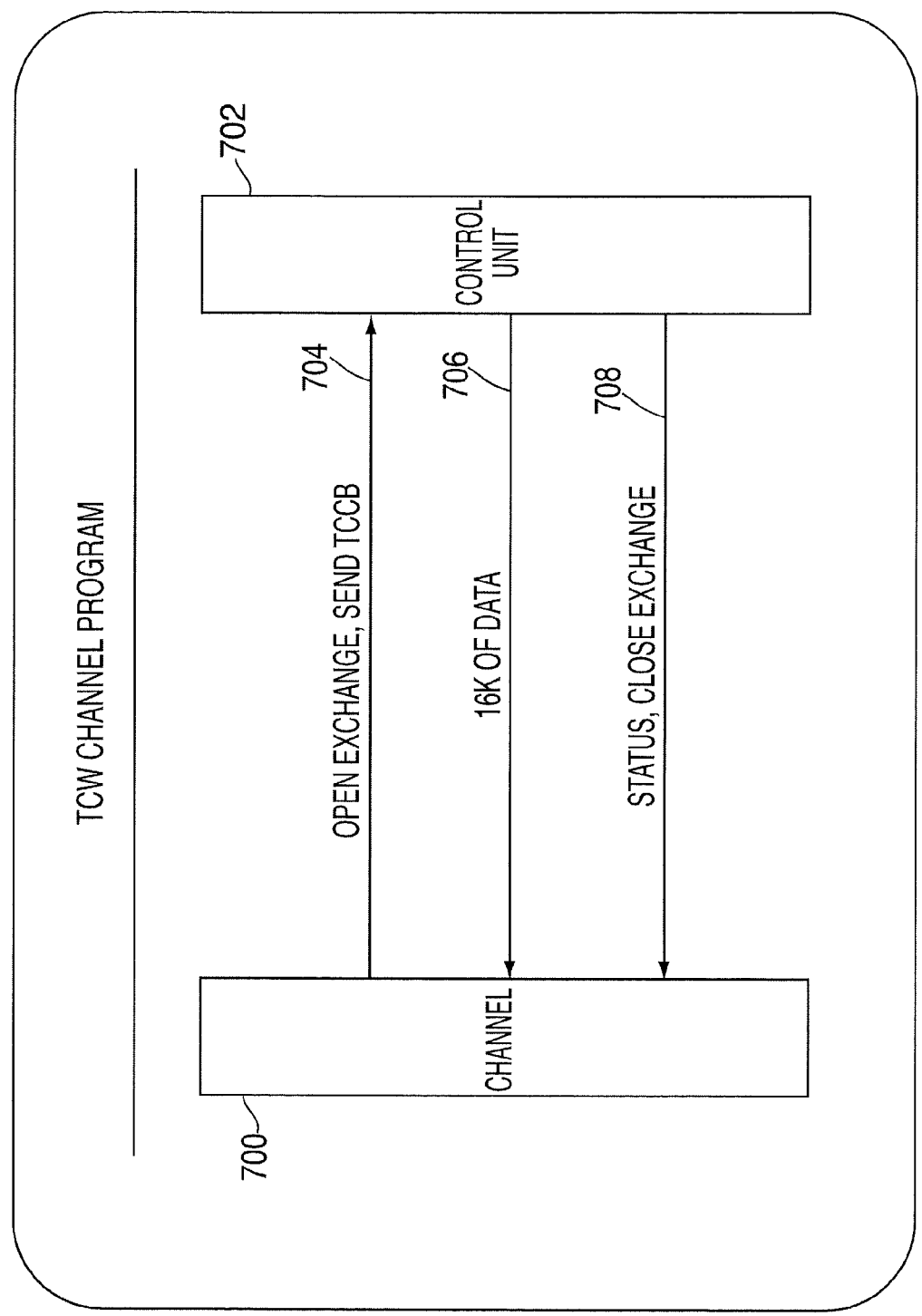
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

In an exemplary embodiment, the CCW channel program of FIG. 6 is implemented using a protocol that supports Command Control Words, for example, a Fibre Connectivity (FICON) protocol. Links operating under this protocol may be referred to as being in a "Command Mode".

In an exemplary embodiment, the TCW channel program of FIG. 7 is implemented using a protocol to execute Transport Control Words, for example, the Transport Mode protocol.

Figure 8:
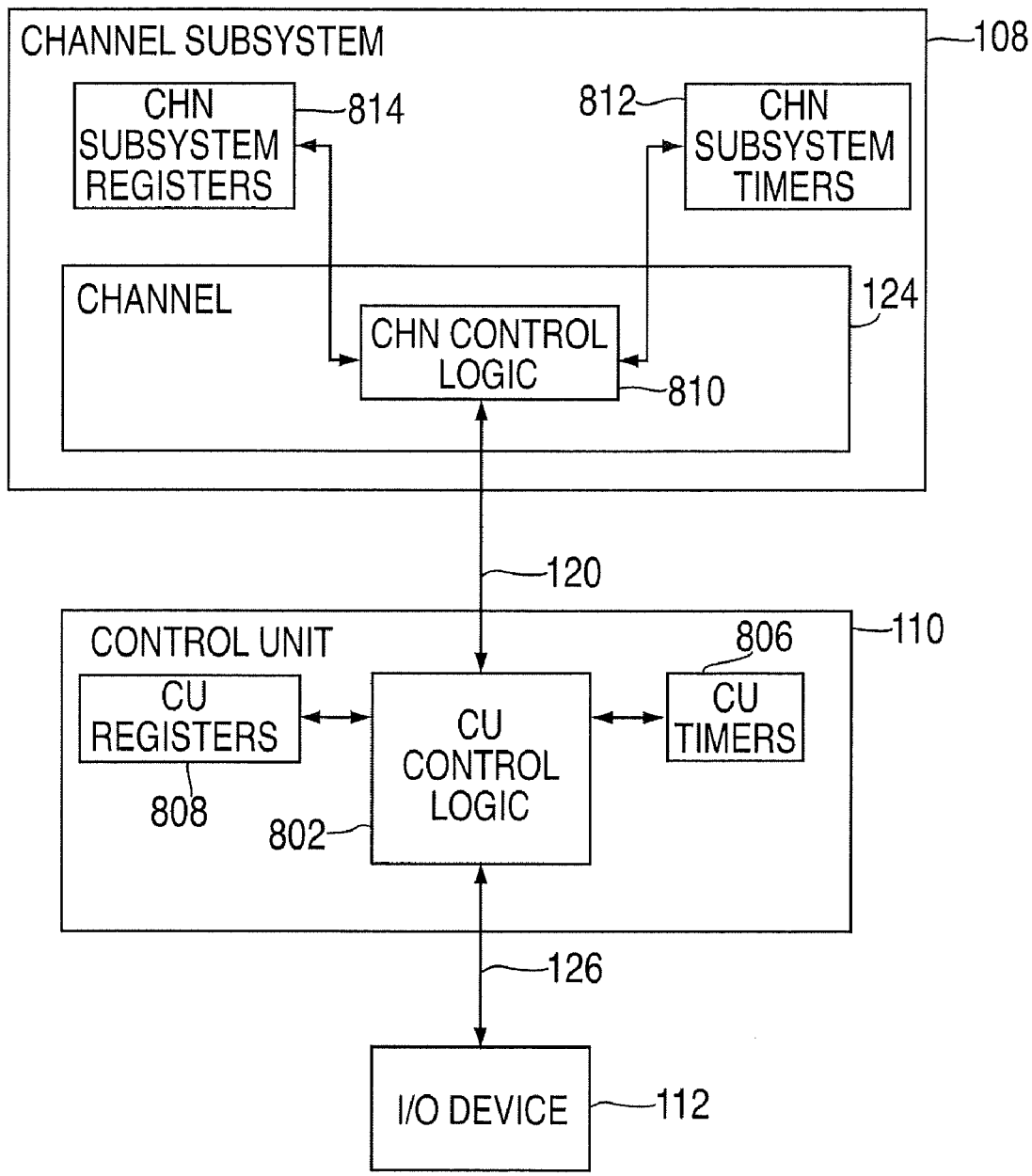
FIG. 8 depicts one embodiment of a control unit and a channel, in accordance with an aspect of the present invention.

Turning now to FIG. 8, one embodiment of the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, as well as receives status information and other feedback from the I/O device 112.

The CU control logic 802 can access and control other elements within the control unit 110, such as CU timers 806 and CU registers 808. The CU timers 806 may include multiple timer functions to establish wait or delay time periods, such as those time periods used in suspending I/O operations. The CU timers 806 may further include one or more countdown timers to monitor and abort I/O operations and commands that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to, for example, establish wait or delay time periods. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

In some exemplary embodiments, the control unit 110 and the channel 124 of FIG. 1 may operate in different modes, i.e., use different protocols. For example, the channel 124 may operate in the Transport Mode and utilize the transport mode protocol, and the control unit 110 may operate in the Command Mode and utilize the FICON protocol. The control unit 110 and the channel 124 may each support the Command Mode and/or the Transport Mode.

The embodiments described herein are described in conjunction with the control unit 110 and the channel 124 supporting the Command Mode and/or the Transport Mode. However, the embodiments may be utilized in conjunction with any initiator or target device supporting any suitable protocol.

In order to successfully complete an I/O operation, a Transport Mode compatible channel 124, i.e., "Transport Mode channel", should be able to determine whether a control unit 110 of interest is also Transport Mode compatible. This determination, and corresponding identification of Transport Mode control units 110, should be able to be performed without disrupting operations or causing problems in control units 110 that support other protocols or modes.

In one exemplary embodiment, there is provided a system and method to allow the channel 124 to identify a compatible control unit 110, i.e., a control unit that supports a mode in which the channel 124 operates. The channel 124 may use a message in a first mode, such as the Command Mode, in combination with at least another message, to determine whether the control unit supports a second mode, for example, the Transport Mode. In an exemplary embodiment, the message in the first mode is a Request Node Identification (RNID) message. A RNID message may be used by the channel 124 to request identification information from the control unit 110.

The channel may receive a response to the message, such as a RNID response, that includes data indicating whether the control unit supports a selected message protocol. In an exemplary embodiment, the selected message protocol is a Process Log-in (PRLI) and Process Log-out (PRLO) message protocol, which may be referred to as "PRLI/PRLO". In an exemplary embodiment, an unused bit may be defined in a field in the RNID response, such as the Node Parameters field, that informs the channel if the control unit does or does not support PRLI/PRLO. PRLI messages may be used to establish service parameters between the channel 124 and the control unit 110, and PRLO messages may be used to invalidate existing service parameters so that new service parameters may be re-established.

RNID, PRLI and PRLO commands and responses are extended link service (ELS) messages. The Process Log-in and Process Log-out Extended Link service may be defined by Fibre Channel Framing and Signaling protocol (FC-FS), which is described further in "ANSI INCITS 433-2007, Information Technology Fibre Channel Link Services (FC-LS)", July 2007, which is hereby incorporated herein by reference in its entirety. The Request Node Identification Extended Link service may be defined by Fiber Channel single byte protocol, which is described in "Fibre Channel Single Byte Command Code Sets-3 Mapping Protocol (FC-SB-3), T11/Project 1357-D/Rev. 1.6, INCITS (March 2003), referenced above and incorporated herein by reference in its entirety.

Once the channel 124 determines that the control unit 110 supports PRLI/PRLO, then a PRLI message is used by the channel 124 to determine if the control unit 110 supports the Transport Mode. If the control unit 110 does support the Transport Mode, the PRLI message is used to establish the required initial Transport Mode operating parameters.

In another exemplary embodiment, there is provided a system and method that allows one of the channel 124 or the control unit 110 (referred to as the "sender") to inform the other (referred to as the "receiver") that it will not accept new I/O operations for a selected period of time, and thereby instruct the receiver to suspend initiation of I/O operations for the period of time. The period of time may be specified by the sender. In one embodiment, this information is provided via a PRLO message, which specifies the period of time for suspension. In another embodiment, the period of time is subject to a maximum delay time specified by the channel 124 for suspension of I/O requests. In another embodiment, the period of time is subject to a limit presented by the channel 124 in a PRLI message.

Figure 9:
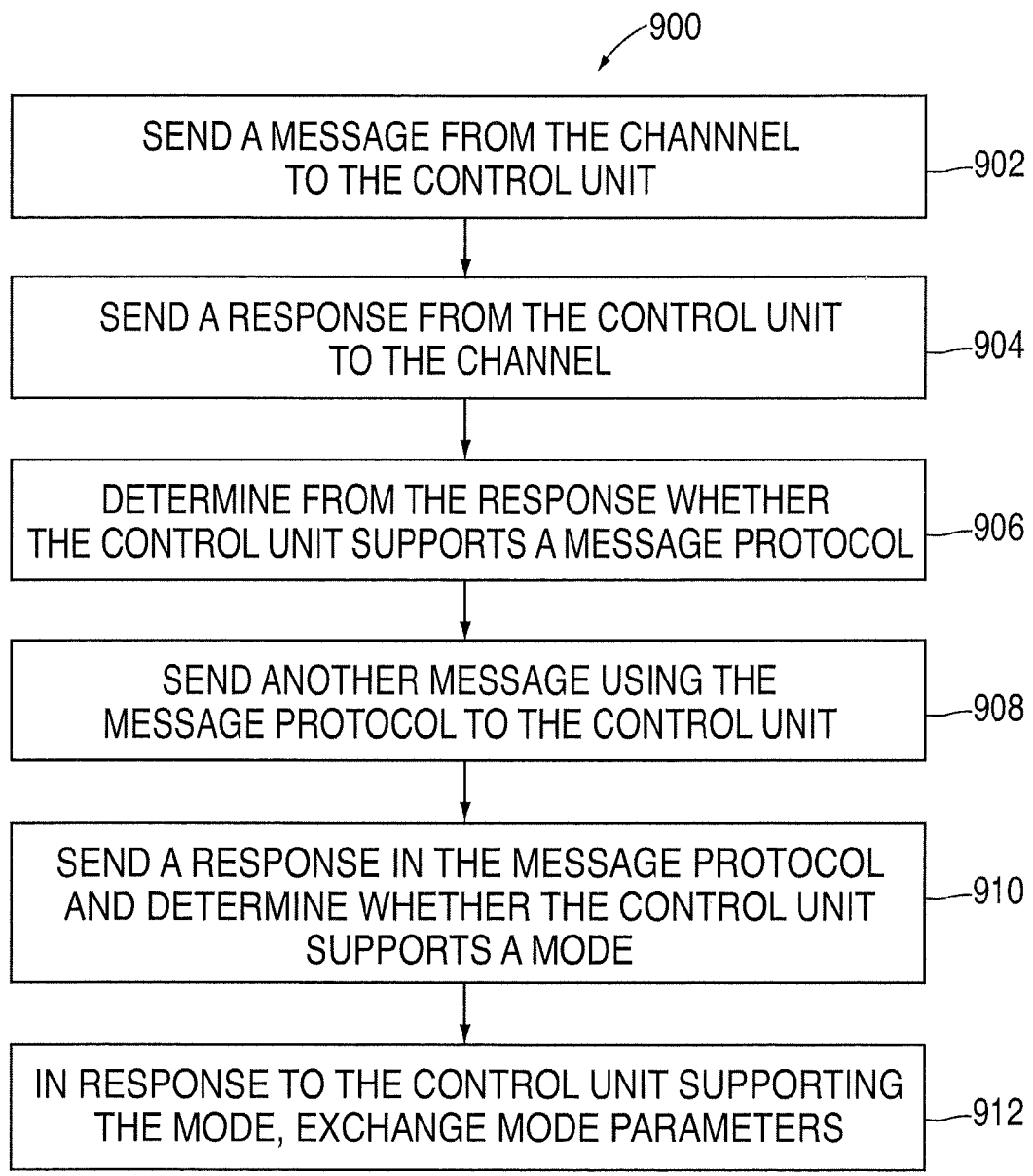
FIG. 9 depicts one embodiment of a process for identifying a compatible control unit of an I/O processing system using data from the control unit.

Turning now to FIG. 9, a process 900 for identifying a compatible control unit 110 of an I/O processing system using data from the control unit 110 will now be described in accordance with exemplary embodiments, and in reference to the I/O processing system 100 of FIG. 1.

At block 902, the channel 124 sends a message to the control unit 110. In one exemplary embodiment, the message is a message that requests identification information, such as a RNID command.

At block 904, the control unit 110 may respond to the message, for example, in the form of a RNID Response. In one exemplary embodiment, a bit may be added in the RNID response. This bit informs the channel that the control unit 110 supports the selected message protocol.

In one example, the selected message protocol is a PRLI/PRLO protocol. The channel may identify a control unit that supports the PRLI/PRLO with a RNID command. A value for a bit in the RNID response may be set to indicate to the channel 124 that that control unit 110 supports PRLI/PRLO. For example, for a RNID response in the Fibre Channel single byte protocol, a bit may be used to identify compatibility, especially a bit that has been reserved in previous protocols.

For example, byte 1 (protocol byte), bit 3, (bits 3 to 7 have been reserved in previous protocols such as Command Mode protocols), of the Node Parameters field of the RNID response may be used to identify the control unit 110 as capable of supporting a Process Login with a Command Mode type code. The value of bits 0, 1 and 2 of this byte are not changed relative to previous protocols. By default, previous Command Mode control units will not turn this bit on in the Node Parameter field of the response to the RNID, thus informing the channel that the control unit does not support PRLI. This bit in the RNID response may be ignored by a non-Transport Mode capable channel 124.

At block 906, the channel 124 determines from the response (e.g., the RNID response) whether the control unit supports the selected message protocol (e.g., PRLI/PRLO).

At block 908, the channel 124 sends a message using the selected message protocol, such as a PRLI message, to determine whether the control unit 110 supports a selected mode, such as Transport Mode. In one exemplary embodiment, a data field is provided in which data may be included in a message in response to a command that indicates whether the mode supported by the channel is also supported by the control unit. The data may indicate to the channel 124 whether the control unit 110 can support the Transport Mode.

In an exemplary embodiment, the PRLI request is transmitted from the channel 124 to the control unit 110 to identify to the control unit 110 the capabilities that the channel 124 expects to use with the control unit 110 and to determine the capabilities of the control unit 110. In one exemplary embodiment, PRLI is used only to establish service parameters; it is not used to establish image pairs (e.g., logical representations of pairs of control units 110 and channels 124) and therefore all fields defined for establishing image pairs and process associaters are not used and are set to 0. Image pair establishment may be accomplished using an Establish Logical Path (ELP) function. The operating parameters negotiated during Process Login apply to all logical paths currently established or to be established between the channel 124 and the control unit 110.

In an exemplary embodiment, if the process login state is ever reset, the channel 124 will start with an RNID message to check for PRLI/PRLO support before resending PRLI to re-establish the service parameters. During link initialization, the Process Login function may be performed after N-Port Login and RNID but before establishment of logical paths. In some recovery scenarios, the PRLI can occur with logical paths already established. The state of the logical paths will not be affected when this occurs.

At block 910, the control unit 110 sends a response using the selected message protocol. For example, the control unit 110 may send a PRLI response to the channel 124. If the bit, i.e., the bit that indicated PRLI/PRLO support, is not set in the PRLI response then the channel 124 may not attempt any Transport Mode operations to the control unit 110 and the control unit 110 may not be marked as Transport Mode capable.

In an exemplary embodiment, in response to the PRLI request, the control unit 110 sends a "PRLI Accept" message to the channel 124 that reports the capabilities of the control unit 110 to the channel 124. An accept response code indicating other than REQUEST EXECUTED may be provided if a Transport Mode Service Parameter page of the PRLI message is incorrect. A Link Service Reject (LS_RJT) may be used to indicate that the PRLI request is not supported or is incorrectly formatted. PRLI accept response codes may be defined in the FC-FS protocol.

At block 912, if the data in the response from the control unit 110 (e.g., the bit set in the PRLI response message) indicates that the control unit supports the Transport Mode, the channel 124 may proceed to establish logical paths (if required), and initiate I/O operations in the Transport Mode.

Figure 10:
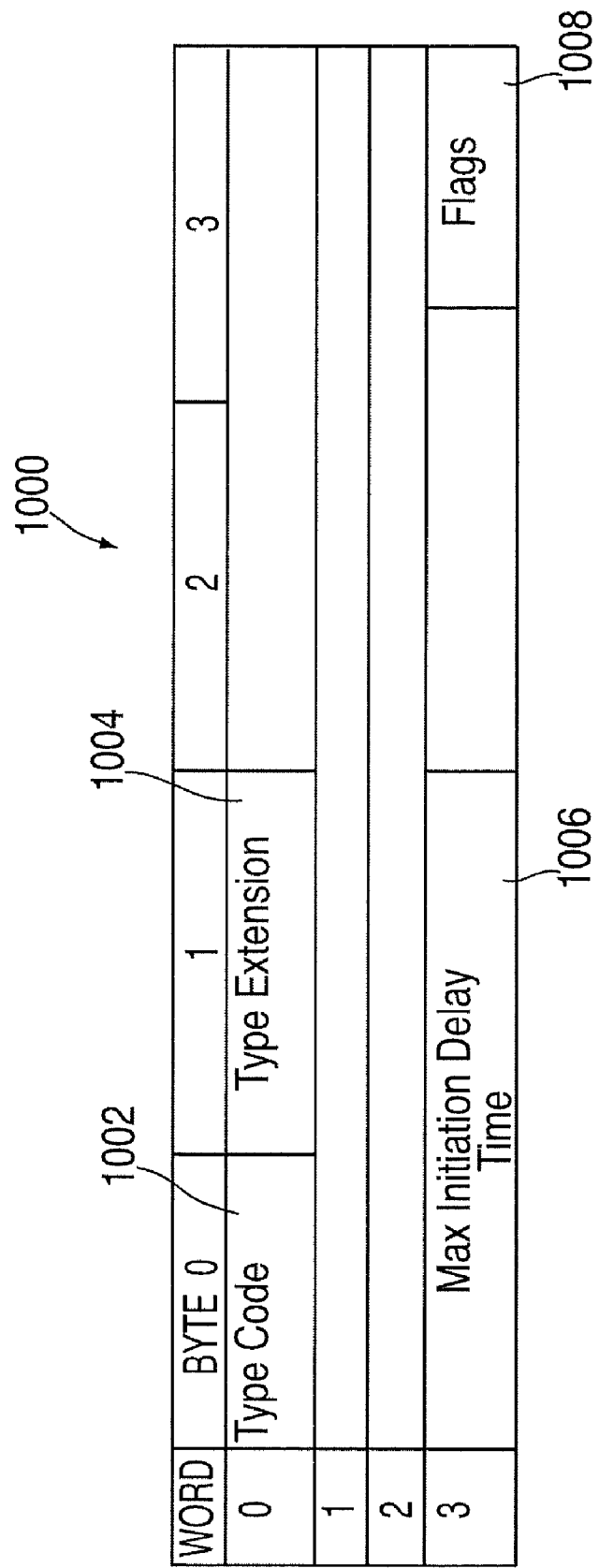
FIG. 10 depicts one embodiment of a request message used to identify a compatible control unit of an I/O processing system.

Turning now to FIG. 10, an example of a PRLI Request message 1000 is depicted. The payload of the PRLI request 1000 may include a service parameter page which includes service parameters for one or all image pairs.

The service parameter page of the PRLI Request message 1000 may include multiple fields, such as type code 1002, type extension 1004, maximum initiation delay time 1006 and flags 1008. Each field in the page of the PRLI Request message 1000 is assigned to a particular byte address. Although one arrangement of fields within the page of the PRLI Request message 1000 is depicted in FIG. 10, it will be understood that the order of fields can be rearranged to alternate ordering within the scope of the disclosure. Moreover, fields in the page of the PRLI Request message 1000 can be omitted or combined within the scope of the invention.

The type code field 1002, located at word 0, byte 0, represents the protocol type code, such as the Fibre Channel Single Byte Protocol type code. For example, a value of hex "1B" in this byte indicates that this service parameter page 1000 is defined in the selected protocol (e.g. Fiber Channel single byte).

The maximum initiation delay time field 1006, located at word 3, byte 0, provides the maximum time (e.g. in seconds) that the channel 124 can allow in the Initiation Delay Time field in a process Logout (PRLO) from the control unit. Initiation delay time is further described below. Word 3, bytes 1 and 3 may be reserved and set to zero.

Flags 1008, in an exemplary embodiment, has the following definition:

Bit 0—Transport Mode/Command Mode. A value of this bit set to one (1) means that the sender supports both Command Mode (e.g. FICON) and Transport Mode. If the bit is set to zero (0), the sender only supports Command Mode. If the channel 124 sets this bit to a one, then the control unit 110 may respond with this bit set to one if it supports the Transport Mode.

Bits 1-6—Reserved.

Bit 7—First Transfer Ready for Data Disabled. If both the channel 124 and control unit 110 choose to disable the first write FCP_XFER_RDY IU, then all I/O operations performing writes between the channel and control unit shall operate without using the FCP_XFER_RDY IU before the first FCP_DATA IU. The FCP_XFER_RDY IU is transmitted to request each additional FCP_DATA IU, if any.

In one exemplary embodiment, the remaining fields in the page of the PRLI Request message 1000 may be reserved and/or set to zero (0). For example, bytes 2 and 3 of word 0, and words 1 and 2 are set to zero. Bytes 1 and 2 of word 3 may also be reserved.

Figure 11:
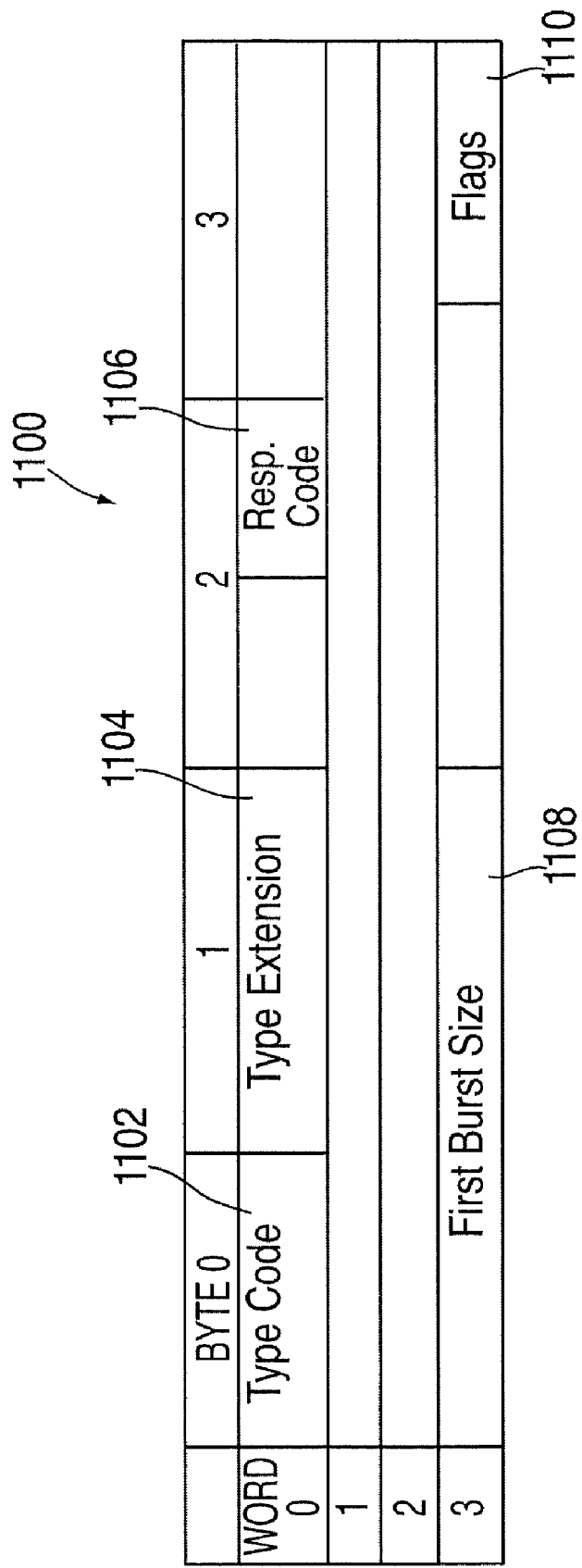
FIG. 11 depicts one embodiment of an accept message used to identify a compatible control unit of an I/O processing system.

Turning now to FIG. 11, an example of a PRLI Accept message 1100 is depicted. The payload of the PRLI Accept message 1100 may include a service parameter page.

The service parameter page of the PRLI Accept message 1100 may include multiple fields, such as type code 1102, type extension 1104, response code 1106, first burst size 1108 and flags 1110. Each field in the page of the PRLI Accept message 1100 is assigned to a particular byte address. Although one arrangement of fields within the page of the PRLI Accept message 1100 is depicted in FIG. 11, it will be understood that the order of fields can be rearranged to alternate ordering, or can be omitted or combined, within the scope of the disclosure.

The type code field 1102, located at word 0, byte 0, is the protocol type code, and is similar to the type code field 1002 of FIG. 10.

The response code field, located at word 0, byte 2, bits 4-7, and is defined by its corresponding protocol, such as the FC-FS protocol.

The First Burst Size field 1108, located at word 3, bytes 0-1, bits 0-15, provides the maximum amount of data (e.g., the maximum number of 4 k byte blocks of data) allowed in the first DATA IU that is sent immediately after the first transmission control IU (TC_IU), when the First Transfer Ready for Data Disabled flag bit (word 3, byte 3, bit 7) is set to one. A value of zero in this field indicates that there is no specified first burst size. Word 3 byte 2 is reserved.

Flags 1110 are similar to the flags 1008 of FIG. 10 described in conjunction with the PRLI Request. The control unit 110 sets values to these flags that correspond to the mode of operation it will run with the channel.

In one exemplary embodiment, the remaining fields in the page of the PRLI Accept message 1100 may be reserved and/or set to zero (0). For example, bits 1-3 of word 0, byte 2, and words 1 and 2 are set to zero. Byte 3 of word 0 is reserved and set to zero. Byte 2 of word 3 may also be reserved.

The following is an example of a procedure used by the channel 124 to identify the mode capability of a targeted control unit 110. In this example, the channel 124, operating in the Transport Mode, uses RNID and PRLI messages in a Log in procedure to identify mode capability. This procedure may occur before any I/O operations are attempted by the channel 124 to the control unit 110. The exemplary procedure is as follows:

1. Perform a Fabric Login.
2. Perform a N_Port Login.
3. Attempt a RNID. The channel 124 sends an RNID message to determine whether the control unit 110 supports PRLI/PRLO. If the RNID fails (e.g., the channel's RNID response timer times out or the channel 124 receives a fabric reject), I/O operations will not be driven to the control unit 110 by channel 124 until some new I/O operation attempted at channel 124 drives a RNID that is successful.

If the RNID is successful, i.e., the channel 124 receives a valid response, the channel 124 determines whether the control unit 110 supports PRLI/PRLO. A successful RNID is any valid response from the control unit 110, which may include, for example, a RNID response or a Link Service Reject. The channel 124 will assume PRLI/PRLO is not supported unless it receives a valid RNID response with the bit set explicitly indicating such support.

4. If PRLI is supported, then the channel 124 initiates a PRLI message. If PRLI is not supported, the channel 124 may drive I/O operations in the Command Mode (e.g., FICON). For example, the channel 124 may drive I/O operations after sending a successful Establish Logical Path (ELP) link control IU.

5. If the channel 124 receives a response from the control unit 110 indicating that transport mode is supported, the channel 124 may initiate I/O operations to the control unit 110 in either the Command Mode or the Transport Mode. In one embodiment, I/O operations are initiated after a successful ELP IU.

Figure 12:
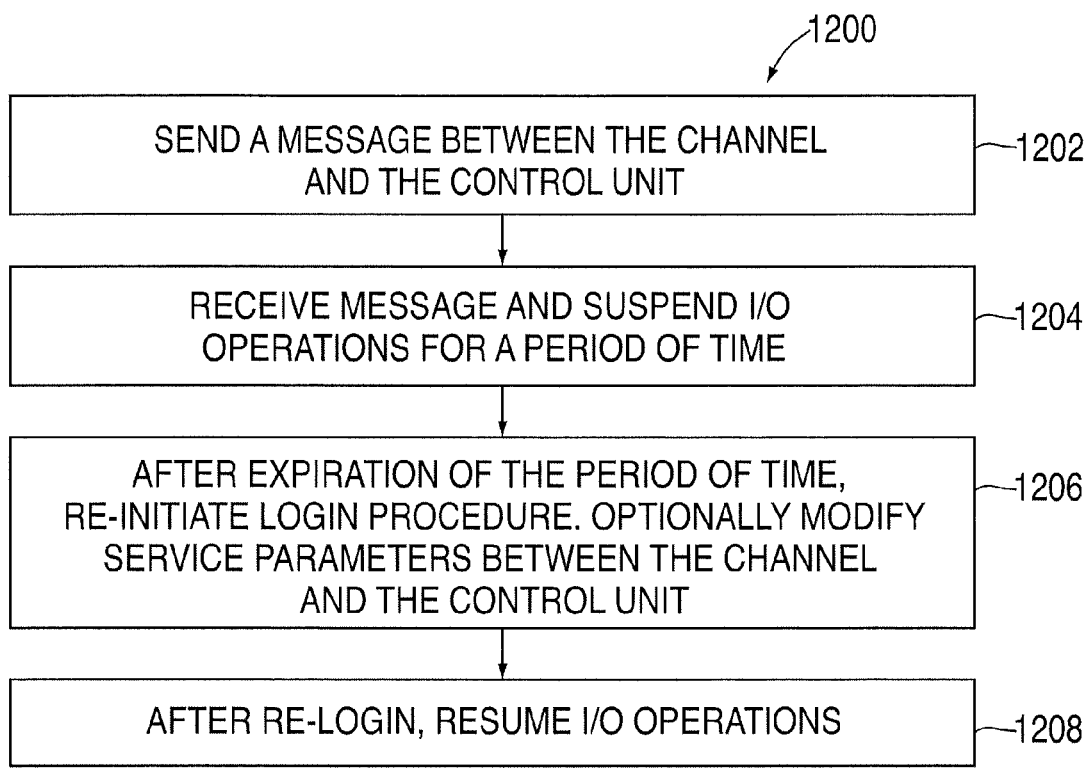
FIG. 12 depicts one embodiment of a process for suspending I/O operations between a channel and a control unit.

Turning now to FIG. 12, a process 1200 for suspending I/O operations between the channel 124 and the control unit 110 will now be described in accordance with exemplary embodiments, and in reference to the I/O processing system 100 of FIG. 1.

At block 1202, the channel 124 or the control unit 110, which has a need to hold off I/O operations for a period of time, may use a message such as a PRLO message to suspend operations. The channel 124 or control unit 110 that sends a PRLO message is referred to herein as the "sender". The channel or control unit that receives (or is intended to receive) the PRLO message is referred to herein as the "receiver".

At block 1204, the receiver receives the PRLO message and suspends all I/O operations for a period of time specified in the PRLO message. For example, if the control unit 110 receives the PRLO, it suspends I/O operations such as status messages. In another example, if a channel 124 receives the PRLO, it suspends I/O operations such as read or write commands. This allows the channel 124 or the control unit 110 to perform whatever internal functions are required without causing the loss of the logical paths or alerts such as interface control checks (IFCCs).

At block 1206, after the period of time specified in the PRLO, the channel 124 may re-initiate the login procedure between the channel 124 and the control unit 110. In an exemplary embodiment, the channel 124 executes a RNID and then a Process Log In.

Figure 13:
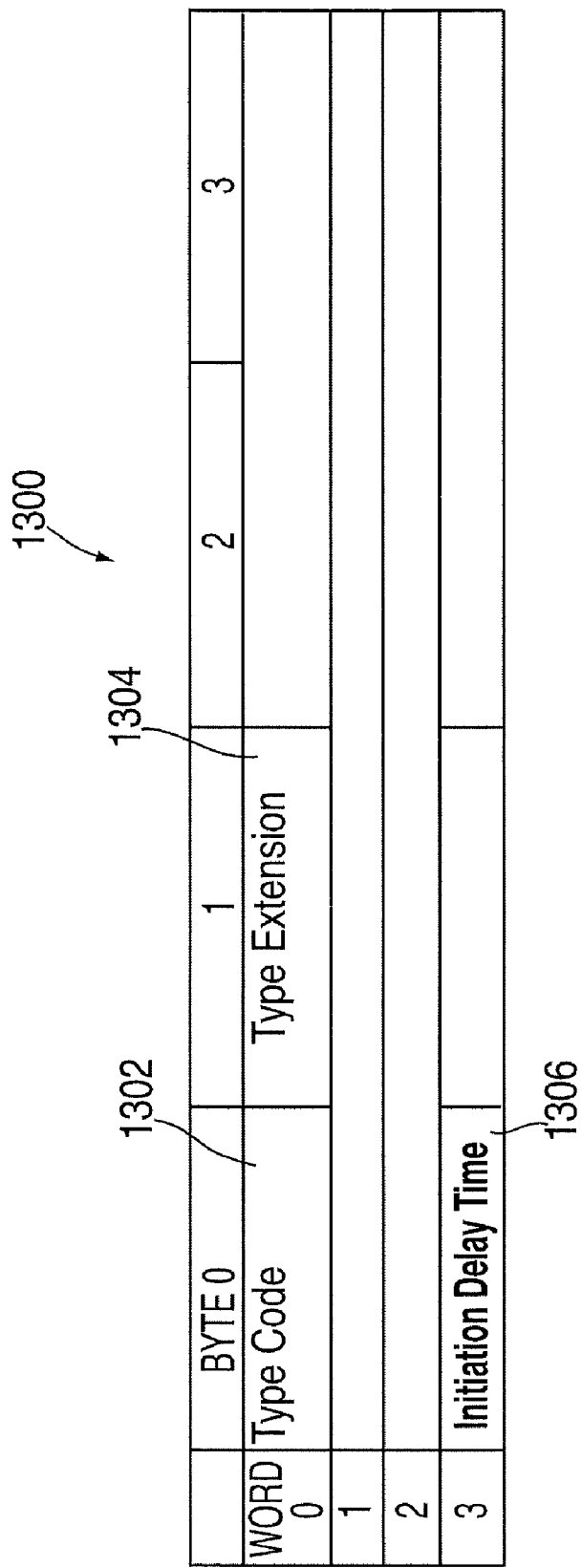
FIG. 13 depicts one embodiment of a request message used to suspend I/O operations between a channel and a control unit.

At block 1208, after completion of the re-login procedure, the channel 124 and the control unit 110 may resume normal I/O operations Turning now to FIG. 13, an example of a PRLO Request message 1300 is depicted. The payload of the PRLO Request 1300 may include a service parameter page, which includes service parameters for one or all image pairs.

The service parameter page of the PRLI Request 1300 may include multiple fields, such as type code 1302, type extension 1304, and initiation delay time 1306. Each field in the page 1300 is assigned to a particular byte address. Although one arrangement of fields within the page of the PRLI Request 1300 is depicted in FIG. 13, it will be understood that the order of fields can be rearranged to alternate ordering within the scope of the disclosure. Moreover, fields in the page of the PRLI Request 1300 can be omitted or combined within the scope of the invention.

The type code field 1302, located at word 0, byte 0, is the protocol type code, and is similar to the type code field 1002 of FIG. 10 described in the PRLI Request.

The initiation delay time field 1306, located at word 3, byte 0, indicates the amount of time that the receiver should wait before initiating any new I/O operations. If the PRLO is sent by the control unit 110, the delay time field 1306 indicates the wait time in seconds before the channel 124 may attempt PRLI to re-establish new operating parameters between the channel 124 and the control unit 110, or send a message such as a Test Initialization link control (TIN) message in response to a state change notification. If the PRLO is sent by the channel 124, the delay time field 1306 is set to a value that the channel 124 wants the control unit 110 to wait before sending I/O messages such as unsolicited status messages, or TIN messages in response to a state change notification. This time limit may be based on the channel's ability to delay sending I/O operation messages to the control unit 110 without causing higher levels of recovery to occur. During the time specified in the delay time field 1306, the channel 124 will not start any new Transport Mode or Command Mode I/O operations to the control unit. In one exemplary embodiment, the maximum value that can be set is specified by the Maximum Initiation Delay Time 1006 set by the channel 124 in the PRLI Request message 1000.

In one exemplary embodiment, the remaining fields in the page 1300 may be reserved and/or set to zero (0). For example, bytes 2 and 3 of word 0, and words 1 and 2 are set to zero. Bytes 1-3 of word 3 may also be reserved.

Figure 14:
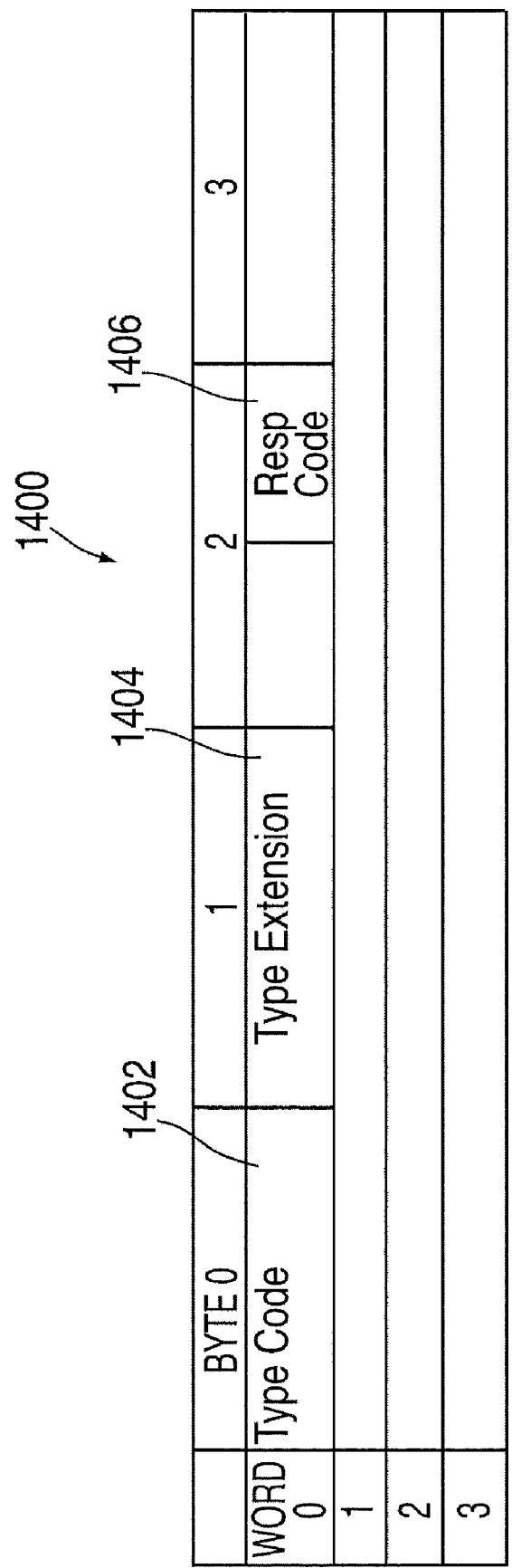
FIG. 14 depicts one embodiment of an accept message used to respond to the request message of FIG. 13.

Turning now to FIG. 14, an example of a PRLO Accept message 1400 is depicted. The payload of the PRLO Accept message 1400 may include a service parameter page, which includes service parameters for one or all image pairs.

The service parameter page of the PRLO Accept message 1400 may include multiple fields, such as type code 1402, type extension 1404, and response code 1406. Each field in the page of the PRLO Accept 1400 is assigned to a particular byte address. Although one arrangement of fields within the page of the PRLO Accept 1400 is depicted in FIG. 14, it will be understood that the order of fields can be rearranged to alternate ordering, or can be omitted or combined, within the scope of the disclosure.

The type code field 1402, located at word 0, byte 0, is the protocol type code, and is similar to the type code field 1102 of the PRLI Accept.

The response code field 1406, located at word 0, byte 2, bits 4-7, is defined by its corresponding protocol, such as the FC-FS protocol.

In one exemplary embodiment, the remaining fields in the page of the PRLO Accept 1400 may be reserved and/or set to zero (0). For example, bits 1-3 of word 0, byte 2, and words 1 and 2 are set to zero. Byte 3 of word 0 is reserved and set to zero. Also, word 3 may be reserved.

The following is an example of a procedure used by the channel 124 to instruct or request suspension of I/O operations from the control unit 110. In this example, the channel 124 sends a PRLO message to the control unit 110 to suspend I/O operations. The procedure is as follows:

1. The channel 124 first stops driving all new Command Mode and Transport Mode operations.
2. The channel 124 may wait a selected amount of time, such as the amount of time specified in the Transport Mode protocol, to allow pending operations to complete.
3. The channel 124 sends a PRLO to the control unit with a period of time defined in the Initiation Delay Time field 1306.
4. The control unit 110 receives the PRLO, and in response performs one or more of the following:
    4(a). Responding to all new Command Mode or Transport Mode commands from the channel 124 with busy messages.
    4(b). Completing all active Command Mode operations and completing or terminating all active Transport Mode operations from the channel 124. The control unit 110 may then wait for a selected time period, such as 100 ms.
    4(b). The control unit 110 then responds with the PRLO Accept message 1400 ("PRLO_ACC").

During the time period specified in the initiation delay time field 1306, the control unit 110 will not attempt to present any unsolicited I/O operation messages, such as asynchronous status messages, to the channel 124 until after at least the channel 124 initiates new I/O operations (e.g., a new PRLI is sent from the channel 124) or until the Initiative Delay Time has passed. If or when the control unit 110 detects a state change, the control unit will not attempt to send a TIN until after the Initiative Delay Time period has passed.

5. After the channel 124 receives the PRLO_ACC, the channel may wait for another selected time period (e.g., 100 milliseconds) and then abort all active exchanges to the control unit 110. The channel 124 may then perform any functions needed that prompted the PRLO.
6. In an exemplary embodiment, the channel 124 may then re-initiate the login procedure with the control unit 110 by sending an RNID to the control unit 110. The channel 124 may not proceed until a successful response has been received for the RNID. After a certain number of unsuccessful attempts (e.g., four attempts), the channel 124 may remove all logical paths locally and drive a state change directly to the control unit 110. In an exemplary embodiment, the channel 124 will attempt to perform an End port to End port Registered State Change Notification (RSCN), or other function to indicate to the control unit that a state change has occurred.
7. The control unit 110 may respond to the RNID by indicating whether it supports PRLI/PRLO.
8. If the control unit 110 supports PRLI/PRLO, the channel 124 may send a PRLI to the control unit 110. The PRLI may include all the service parameters for Transport Mode operation. The channel 124 may not proceed until a successful response has been received for the PRLI. The control unit 110 responds with the PRI ACC response, If a state change event did occur, the control unit 110 may send the required TIN independent of the Initiation Delay Time period.
9. In an exemplary embodiment, if the control unit 110 does not support PRLI/PRLO, then all of the Transport Mode operations that the channel 124 may have queued up are returned to the OS 103 with a program check and a related alert, such as a Subchannel-Status Extension field reason code: "Transport Mode not supported by the CU".
10. The channel 124 is now ready to drive new I/O operations to the control unit 110.

The following is an example of a procedure used by the control unit 110 to instruct or request suspension of I/O operations from the channel 124. In this example, the control unit 110 sends a PRLO message to the channel 124 to suspend I/O operations. The procedure is as follows:

1. First, the control unit 110 may return busy signals for any messages regarding new I/O operations, and may complete or terminate all pending Transport Mode and Command Mode operations.

2. The control unit 110 sends a PRLO to the channel 124 with a period of time defined in the Initiation Delay Time field 1306.

3. The channel 124 stops driving new Command Mode and Transport Mode operations and waits a selected time period (e.g., at least 100 ms) before responding with a PRLO ACC. The channel 124 may also complete or terminate all pending operations, and then abort any exchanges that are still active and generate an alert such as an interface control check (IFCC) interrupt for each exchange aborted.

4. The channel 124 waits the Initiative Delay Time period.

5. The channel 124 then sends the RNID message and does not proceed with Channel Mode or Transport Mode operations until a successful response from the control unit 110 has been received for the RNID. This process is similar to the process used when initiating the login procedure for the first time.

6. The control 110 unit may respond to the RNID by indicating whether it supports PRLI/PRLO.

7. If the control unit 110 supports PRLI/PRLO, the channel 124 sends a PRLI to the control unit 110. The PRLI may include all service parameters for Transport Mode operation. The channel 124 may not proceed until a successful response has been received for the PRLI. The control unit 110 may respond with the PRLI Accept response 1400.

8. In an exemplary embodiment, if a state change is received anytime between the PRLO and a successful PRLI, the channel 124 will drive a TIN. The channel 124 must also delay initiative to send the TIN until the time expires or an asynchronous status message is received from the control unit 110. If the TIN is unsuccessful, then the logical paths may be removed and re-established before new I/O operations are initiated.

9. In an exemplary embodiment, if the PRLI is not successful, or if the control unit does not support PRLI/PRLO, then all of the Transport Mode operations that the channel 124 may have queued up are returned to the OS 103 with a program check and a related alert, such as a Subchannel-Status Extension field reason code: "Transport Mode not supported by the CU".

10. The channel 124 is now ready to drive new I/O operations to the control unit 110.

The following is an example of a procedure used by the control unit 110 to perform one or more system changes. Such changes may include, without limitation, at least one update such as a code update and/or reload, a computer program installation, a control unit recovery, and a change in operating parameters; and change operating parameters. The computer program installation may include installation of firmware by, for example, an adapter in the host system 101. For example, this procedure allows for control unit recovery to occur without interfering with pending I/O operations, or causing errors and/or alerts such as interface control checks (IFCCs). In one example, a change in operating parameters may include a mode change of the channel 124 and/or the control unit 110, such as a change between the Transport Mode and the Command Mode.

Although this exemplary procedure is described as being performed by the control unit 110, it may also be performed by the channel 124. This procedure may incorporate the use of the PRLO message. The PRLO, RNID and PRLI may be used by the control unit 110 to dynamically change the operating parameters and perform other system changes without interfering with ongoing system operations and without losing the logical paths that were previously established. The procedure is as follows:

1. To change the operating parameters the control unit 110 sends a Process Log out with a time period set in the Initiation Delay Time field 1306.

2. The control unit 110 may perform any required or desired changes in operating parameters or perform any updates needed or desired.

3. In response to the PRLO, the channel 124 suspends I/O operations for the period specified in the Delay Time field 1306, and thereafter initiates a new Process Log in to establish the new parameters.

For example, if a logical connection has been made between a Transport Mode capable channel 124 and the control unit 110, and the control unit 110 needs to perform an update, such as a Licensed Internal Code (LIC) back-off to a code load that does not support Transport Mode, or needs to perform a LIC code update that now supports Transport Mode, the control unit 110 first sends a Process Log out as in the example described above.

The control unit 110 may perform the code update after sending the PRLO.

The channel 124 suspends all new work to the control unit 110 and waits the amount of time specified in the PRLO message, before sending a RNID to the control unit 110. In an exemplary embodiment, only if the bit is set in the RNID response that indicates support for PRLI will the channel send a PRLI to the control unit 110 as part of re-establishing a link with the control unit 110. This allows a code reload to work independent of a level change, either forward or backward relative to supporting or not supporting Transport Mode.

If the control unit 110 no longer supports Transport Mode, the channel 124 will return all the Transport Mode I/O operations for the control unit 110 to the OS 103 with a program check and a related alert, such as a Subchannel-Status Extension field reason code: "Transport Mode not supported by the CU". The Transport Mode I/O operations being returned to the OS 103 may inform the OS 103 that the control unit 110 no longer supports Transport Mode.

In an exemplary embodiment, if a control unit's code is updated from supporting only Command Mode to supporting Transport Mode, the control unit 110 will transmit a State Change command to the channel 124. This will cause a channel 124 that supports Transport Mode to send an RNID before the channel 124 sends the TIN message. The RNID accept from the control unit 110 informs the channel 124 that the control unit now supports PRLI/PRLO. This will cause the channel 124 to send the PRLI to the control unit 110 and discover that the control unit 110 supports Transport mode. This will now allow the channel 124 to accept Transport mode I/O operations for the control unit 110.

In an exemplary embodiment, the control unit 110 may also generate a summary status to the OS 103. This will result in the operating system reading node descriptor data from the control unit 110 that will inform the operating system that the control unit 110 now supports Transport Mode.

Technical effects of exemplary embodiments include the ability of the channel subsystem to identify control units as compatible (e.g., transport mode capable) without causing problems in an incompatible (e.g., command mode capable such as FICON) control unit that does not support the mode of the channel subsystem. Other technical effects include the ability of the channel subsystem or the control unit to direct the suspension of I/O operations for a period of time.

The systems and methods described herein provide numerous advantages, in that they provide an effective way for a channel to determine whether a control unit operates in a compatible mode. Additional advantages include provision of an effective way for the control unit to suspend commands without the use of busy messages or other responses that may cause errors in the I/O sequence. Further advantages include the ability to perform system changes, such as exchanging selected operating parameters between the control unit and the channel, without causing errors in I/O function and without causing loss of logical paths. Prior art methods do not provide an ability to perform such system changes without avoiding errors, especially errors in I/O operations initiated before or during such changes.

For example, there is no link protocol using CCWs (e.g., FICON) that includes protocols for exchanging operating parameters required by protocols using TCWs (e.g., transport mode protocol). Furthermore, there is no protocol that allows either the channel or the control unit to inform the other that it wants to stop receiving requests for new work for a selected period of time.

In prior art FICON protocols, for example, when the channel needs to suspend operations, it will stop driving new work, i.e., sending new commands for new I/O operations. When the control unit needs to suspend operations, it will respond to commands for new work with a "busy" message. However, this response may result in an error such as an interface timeout and an associated interface control check (IFCC), and/or result in the loss of the logical path established by, e.g., the "Establish Logical Path" (ELP) link control IU.

The systems and methods described herein overcome these disadvantages and provide the advantages described above.

Figure 15:
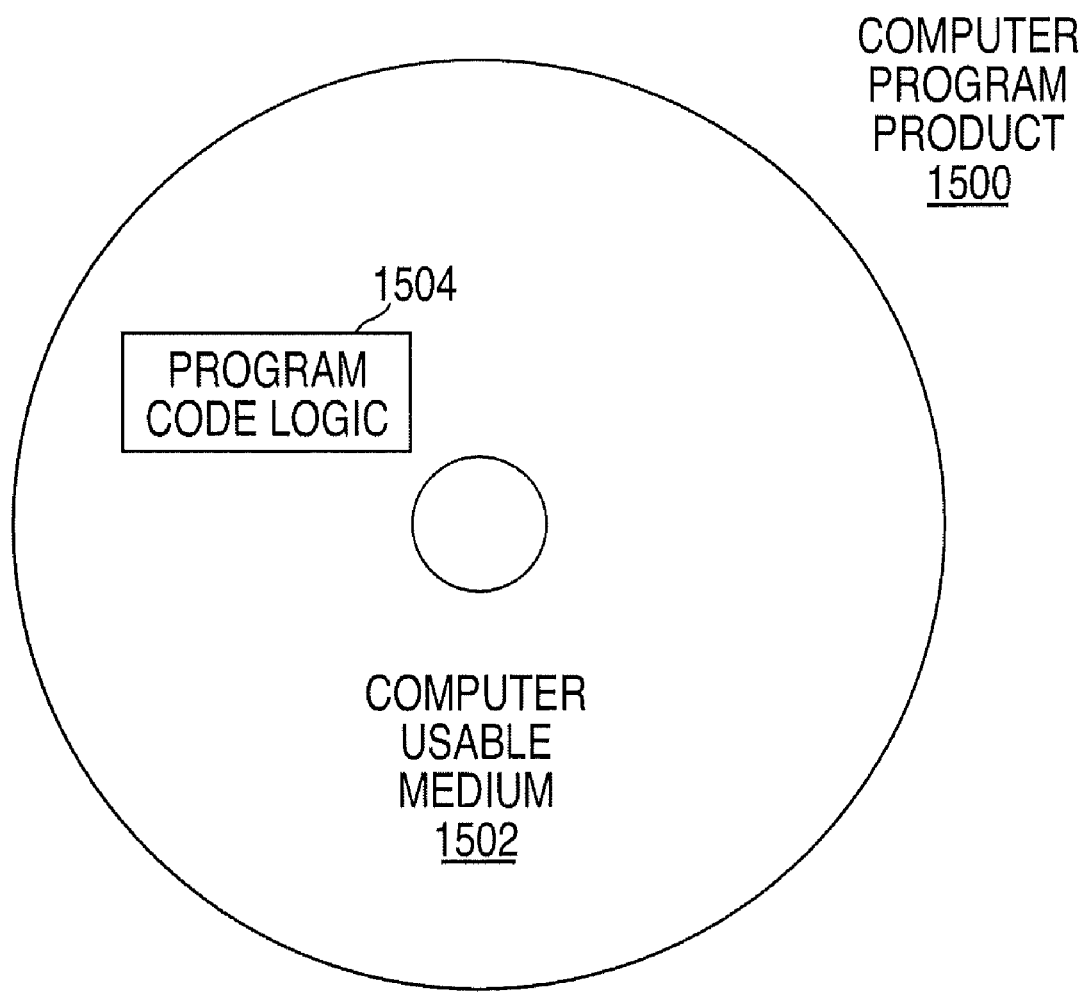
FIG. 15 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1500 as depicted in FIG. 15 on a computer usable medium 1502 with computer program code logic 1504 containing instructions embodied in tangible media as an article of manufacture. Exemplary articles of manufacture for computer usable medium 1502 may include floppy diskettes, CD-ROMs, hard drives, universal serial bus (USB) flash drives, or any other computer-readable storage medium, wherein, when the computer program code logic 1504 is loaded into and executed by a computer, the computer becomes an apparatus for practicing the invention. Embodiments include computer program code logic 1504, for example, whether stored in a storage medium, loaded into and/or executed by a computer, or transmitted over some transmission medium, such as over electrical wiring or cabling, through fiber optics, or via electromagnetic radiation, wherein, when the computer program code logic 1504 is loaded into and executed by a computer, the computer becomes an apparatus for practicing the invention. When implemented on a general-purpose microprocessor, the computer program code logic 1504 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing communications between an initiator unit in network communication with a target unit in an input/output processing system, comprising a tangible storage medium readable by a processing circuit and storing instructions for execution by the processing circuit for performing a method comprising:
   responsive to a communication determining that a selected protocol is supported by the initiator unit and the target unit, the selected protocol supporting suspension of input/output (I/O) operations, receiving by the target unit, a network message from the initiator unit, the network message requesting suspension of input/output operations between the initiator and the target for a period of time, the period of time being defined by the network message, the target unit and the initiator unit selected from one of a channel subsystem of a host computer system and a control unit capable of controlling an input/output (I/O) device;
   responsive to the network message being received, suspending transmission of input/output operations to the initiator unit by the target unit for the defined period of time; and
   responsive to expiration of the period of time, resuming transmission of input/output operations by the target unit.

2. The computer program product of claim 1, wherein the method further comprises, during the period of time, performing a system change consisting of at least one of an update, a computer program installation, a recovery operation, or a change in operating parameters.

3. The computer program product of claim 2, wherein the computer program installation is a firmware installation performed by a host computer system.

4. The computer program product of claim 2, wherein the change in operating parameters comprises a change between a first operating mode and a second operating mode of at least one of the target unit and the initiator unit.

5. The computer program product of claim 4, wherein the first operating mode uses a first protocol configured to support Channel Command Words (CCW), and the second operating mode uses a second protocol configured to support Transport Control Words (TCW).

6. The computer program product of claim 2, wherein the update is at least one of a code update and a code reload.

7. The computer program product of claim 2, wherein one of the target unit and the initiator unit is a channel subsystem of a host computer system, and another of the target unit and the initiator unit is a control unit capable of commanding and determining a status of an I/O device.

8. The computer program product of claim 7, wherein the recovery is a control unit recovery.

9. The computer program product of claim 2, wherein the network message is a Process Log-out (PRLO) message.

10. The computer program product of claim 9, wherein the initiator unit, prior to sending the PRLO message, performs at least one of: sending at least one busy signal to the channel subsystem in response to at least one request for execution of an input/output operation, completing pending input/output operations, and terminating pending input/output operations.

11. The computer program product of claim 9, further comprising initiating a Process Log-in (PRLI) message after performing the system change.

12. The computer program product of claim 11, wherein initiating the PRLI message comprises:
   sending an identification message from the target unit to the initiator unit to determine whether the initiator unit supports a PRLI/PRLO protocol; and
   responsive to receiving an identification message response indicating that the initiator unit supports the PRLI/PRLO protocol, sending the PRLI message to the initiator unit.

13. An apparatus for processing communications in an input/output processing system, comprising:
   a target unit in network communication with an initiator unit, the apparatus configured to perform:
   responsive to a communication determining that a selected protocol is supported by the initiator unit and the target unit, the selected protocol supporting suspension of input/output (I/O) operations, receiving by the target unit, a network message from the initiator unit, the network message requesting suspension of input/output operations between the initiator and the target for a period of time, the period of time being defined by the network message, the target unit and the initiator unit selected from one of a channel subsystem of a host computer system and a control unit capable of controlling an input/output (I/O) device;
   responsive to the network message being received, suspending transmission of input/output operations to the initiator unit by the target unit for the defined period of time; and
   responsive to expiration of the period of time, resuming transmission of input/output operations by the target unit.

14. The apparatus of claim 13, wherein the apparatus further performs, during the period of time, a system change consisting of at least one of an update, a computer program installation, a recovery operation, or a change in operating parameters.

15. The apparatus of claim 14, wherein the computer program installation is a firmware installation performed by a host computer system.

16. The apparatus of claim 14, wherein the change in operating parameters comprises a change between a first operating mode and a second operating mode of at least one of the target unit and the initiator unit.

17. The apparatus of claim 14, wherein one of the target unit and the initiator unit is a channel subsystem of a host computer system, and another of the target unit and the initiator unit is a control unit capable of commanding and determining a status of an I/O device.

18. The apparatus of claim 14, wherein the network message is a Process Log-out (PRLO) message.

19. The apparatus of claim 14, further comprising initiating a Process Log-in (PRLI) message to establish the system change.

20. A method of processing communications between an initiator unit in network communication with a target unit in an input/output processing system, the method comprising:
   responsive to a communication determining that a selected protocol is supported by the initiator unit and the target unit, the selected protocol supporting suspension of input/output (I/O) operations, receiving by the target unit, a network message from the initiator unit, the network message requesting suspension of input/output operations between the initiator and the target for a period of time, the period of time being defined by the network message, the target unit and the initiator unit selected from one of a channel subsystem of a host computer system and a control unit capable of controlling an input/output (I/O) device;
   responsive to the network message being received, suspending transmission of input/output operations to the initiator unit by the target unit for the defined period of time; and
   responsive to expiration of the period of time, resuming transmission of input/output operations by the target unit.

21. The method of claim 20, further comprising, during the period of time, performing a system change consisting of at least one of an update, a computer program installation, a recovery operation, or a change in operating parameters.

22. The method of claim 21, wherein one of the target unit and the initiator unit is a channel subsystem of a host computer system, and another of the target unit and the initiator unit is a control unit capable of commanding and determining a status of an I/O device.

23. The method of claim 21, wherein the network message is a Process Log-out (PRLO) message.

24. The computer program product of claim 1, wherein the method further comprises the step of resuming transmission of input/output operations by the target unit responsive to a message from the initiator unit sent during the period of time.

25. The apparatus of claim 13, wherein the apparatus is configured to further perform the step of resuming transmission of input/output operations by the target unit responsive to a message from the initiator unit sent during the period of time.

26. The method of claim 20, further comprising the step of resuming transmission of input/output operations by the target unit responsive to a message from the initiator unit sent during the period of time.

27. The computer program product of claim 1, wherein the selected protocol is selected from at least one of a first protocol configured to support Channel Command Words (CCW) and a second protocol configured to support Transport Control Words (TCW).

28. The apparatus of claim 13, wherein the selected protocol is selected from at least one of a first protocol configured to support Channel Command Words (CCW) and a second protocol configured to support Transport Control Words (TCW).

29. The method of claim 20, wherein the selected protocol is selected from at least one of a first protocol configured to support Channel Command Words (CCW) and a second protocol configured to support Transport Control Words (TCW).

* * * * *